US008892161B2

(12) United States Patent
Suzuki et al.

(10) Patent No.: US 8,892,161 B2
(45) Date of Patent: Nov. 18, 2014

(54) RADIO COMMUNICATION SYSTEM AND METHOD USING SPATIAL DIVERSITY AND SPATIAL MULTIPLEXING MODES

(75) Inventors: Shigeto Suzuki, Osaka (JP); Keiji Hikoso, Osaka (JP); Mitsuru Sakamoto, Osaka (JP); Yuhsuke Takagi, Osaka (JP); Tadashi Shimonabe, Osaka (JP); Akira Ohshima, Osaka (JP)

(73) Assignee: Huawei Technologies Co., Inc., Shenzhen (CN)

( * ) Notice: Subject to any disclaimer, the term of this patent is extended or adjusted under 35 U.S.C. 154(b) by 937 days.

(21) Appl. No.: 12/863,147

(22) PCT Filed: Jan. 16, 2009

(86) PCT No.: PCT/JP2009/050540
§ 371 (c)(1),
(2), (4) Date: Jul. 15, 2010

(87) PCT Pub. No.: WO2009/091028
PCT Pub. Date: Jul. 23, 2009

(65) Prior Publication Data
US 2010/0291918 A1 Nov. 18, 2010

(30) Foreign Application Priority Data

Jan. 18, 2008 (JP) ................ P2008-009451

(51) Int. Cl.
*H04B 7/00* (2006.01)
*H04M 1/00* (2006.01)
*H04B 7/06* (2006.01)
*H04W 88/06* (2009.01)
*H04B 7/08* (2006.01)
*H04W 72/02* (2009.01)

(52) U.S. Cl.
CPC .............. *H04W 88/06* (2013.01); *H04W 72/02* (2013.01); *H04B 7/0697* (2013.01); *H04B 7/0689* (2013.01); *H04B 7/0871* (2013.01)
USPC ........... 455/553.1; 455/500; 455/560; 455/68

(58) Field of Classification Search
CPC .... H04B 7/0413; H04B 7/063; H04B 7/0686; H04B 7/0689; H04B 7/0697; H04B 7/0628; H04B 7/08; H04B 7/0871; H04L 1/0023; H04L 1/0025; H04W 88/06
USPC ................. 455/68, 69, 500, 522, 553.1, 560; 370/231
See application file for complete search history.

(56) References Cited

U.S. PATENT DOCUMENTS 8,054,898 B2 * 11/2011 Tong et al. .................... 375/260
8,385,246 B2 * 2/2013 Sawahashi et al. ........... 370/312

(Continued)

FOREIGN PATENT DOCUMENTS

EP 1 075 103 A1 2/2001
JP 2000-244444 A 9/2000

(Continued)

OTHER PUBLICATIONS

3GPP TR 25.814 V7.0.0, Jun. 2006; "3rd Generation Partnership Project; Technical Specification Group Radio Access Network".*

(Continued)

*Primary Examiner* — Wesley Kim
(74) *Attorney, Agent, or Firm* — Slater & Matsil, L.L.P.

(57) ABSTRACT

A radio communication system includes transmission/reception devices which perform communication by dynamically switching a first transmission mode and a second transmission mode having a lower quality than the first transmission mode, wherein the transmission/reception devices have a transmission mode decision means which fixes a transmission mode upon communication to the first transmission mode for a given period of time.

16 Claims, 15 Drawing Sheets

(56) References Cited

U.S. PATENT DOCUMENTS

| | | | |
|---|---|---|---|
| 2002/0080735 A1* | 6/2002 | Heath et al. | 370/328 |
| 2002/0126764 A1 | 9/2002 | Murakami et al. | |
| 2003/0060173 A1 | 3/2003 | Lee et al. | |
| 2006/0198460 A1* | 9/2006 | Airy et al. | 375/267 |
| 2006/0234729 A1* | 10/2006 | Murakami et al. | 455/462 |
| 2007/0189242 A1* | 8/2007 | Hosokawa et al. | 370/338 |
| 2008/0002568 A1* | 1/2008 | Wu et al. | 370/208 |
| 2008/0080635 A1* | 4/2008 | Hugl et al. | 375/267 |
| 2008/0132281 A1* | 6/2008 | Kim et al. | 455/562.1 |
| 2009/0232243 A1 | 9/2009 | Tsuboi et al. | |
| 2010/0046445 A1* | 2/2010 | Sawahashi et al. | 370/329 |
| 2012/0188881 A1* | 7/2012 | Ma et al. | 370/252 |

FOREIGN PATENT DOCUMENTS

| | | | |
|---|---|---|---|
| JP | 2002-204275 A | 7/2002 | |
| JP | 2003-87191 A | 3/2003 | |
| JP | 2003-318853 A | 11/2003 | |
| JP | 2005-39807 A | 2/2005 | |
| JP | 2005-79836 A | 3/2005 | |
| JP | 2005-318419 A | 11/2005 | |
| WO | WO 2007/037415 A1 | 4/2007 | |

OTHER PUBLICATIONS

3GPP TSG WG Meeting #44bis, Mar. 31, 2006; "Basic Schemes of Downlink MIMO Channel Transmissions for E-UTRA".*

3GPP TSG RAN WG1 Meeting #46, Sep. 1, 2006; "Downlink MIMO Scheme in E-UTRA".*

3GPP TSG RAN WG1 Meeting #44-bis, R1-060774, "Evaluation of Downlink MIMO Transmission Mode Selection", Athens, Greece, Mar. 27-31, 2006.

3GPP TSG-RAN Working Group 1 Meeting #44, R1-060647, "DL-Adaptive STTD/SM Performance Evaluation for E-UTRA", Denver, Colorado, Feb. 13-17, 2006.

* cited by examiner

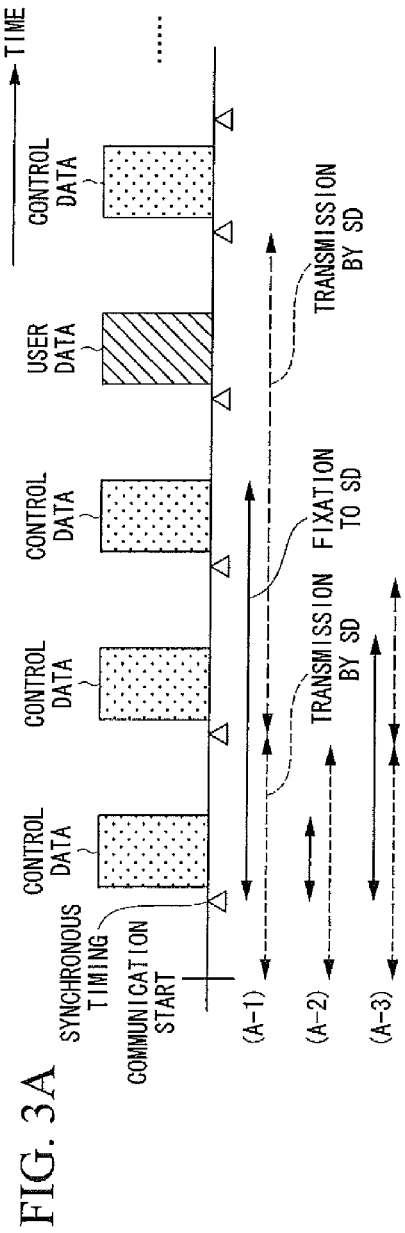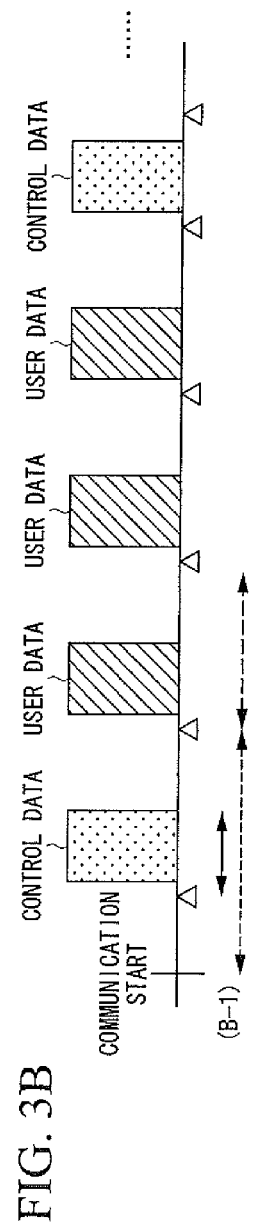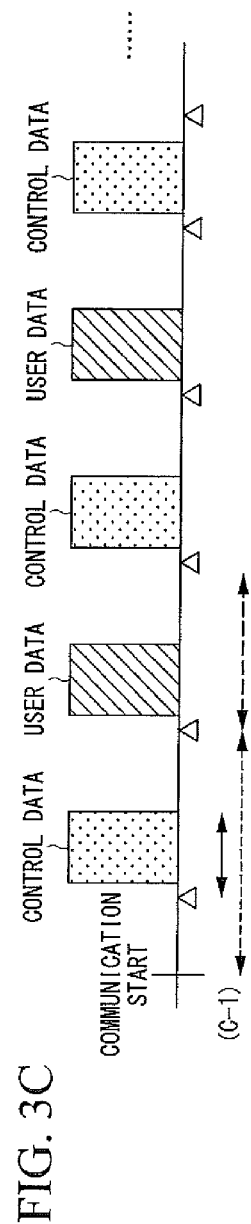

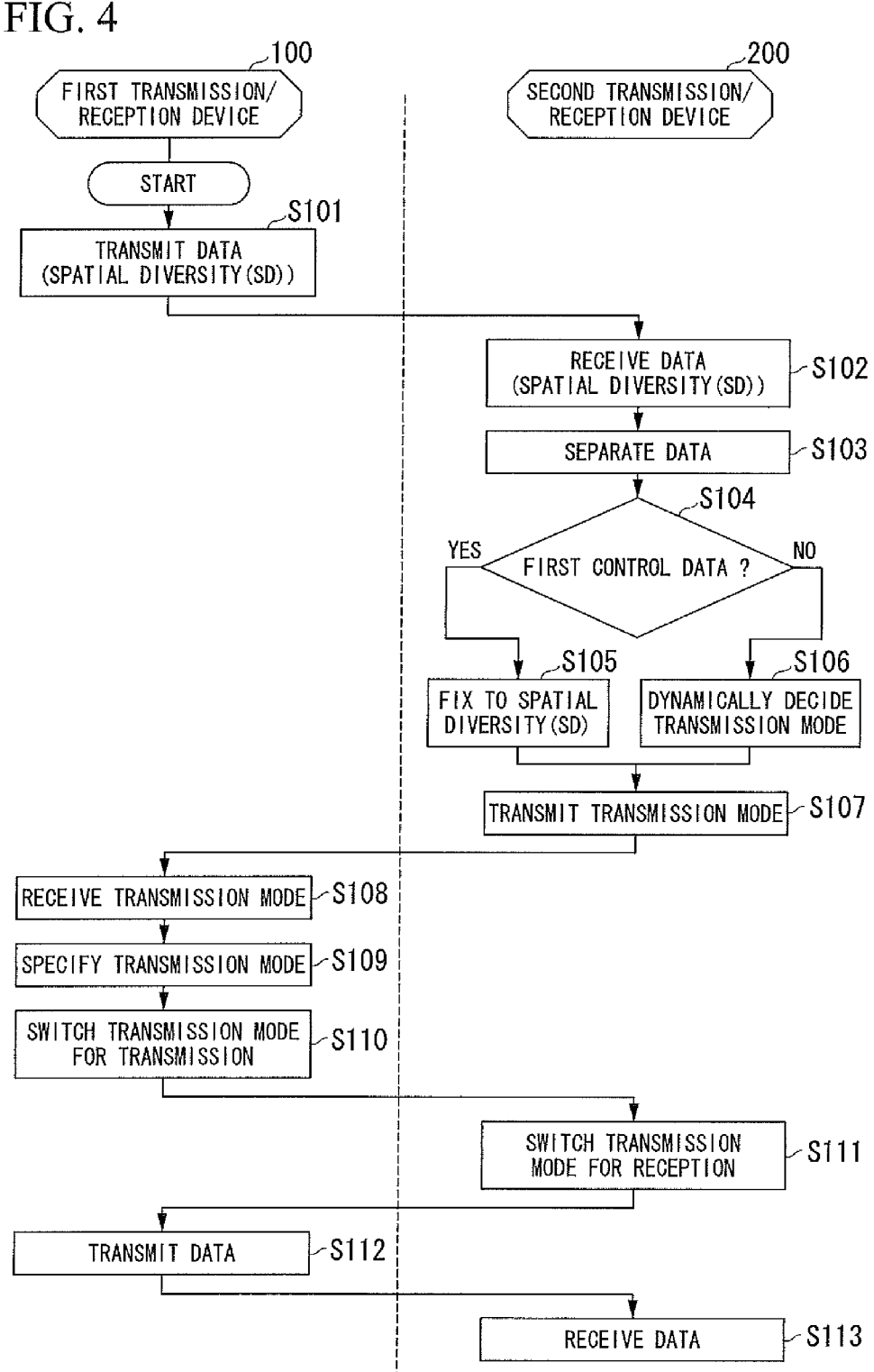

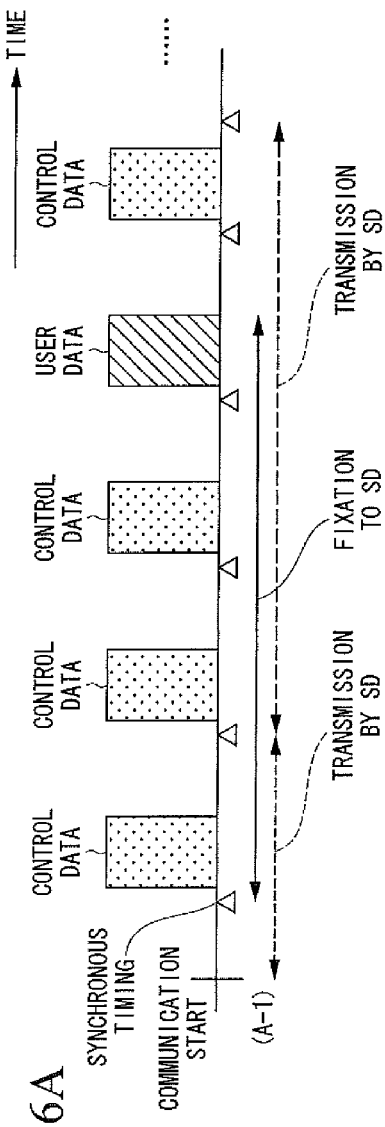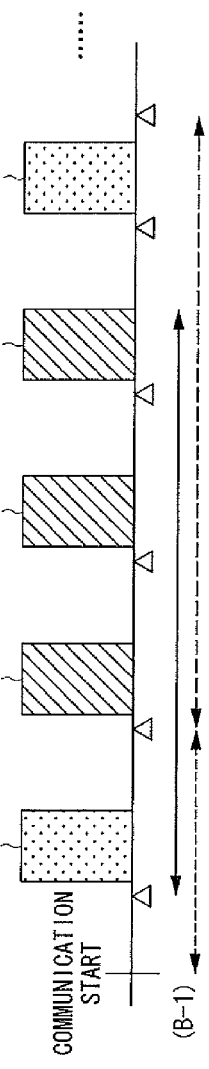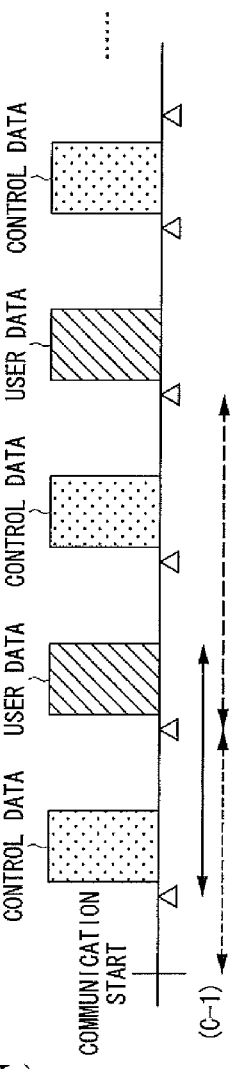

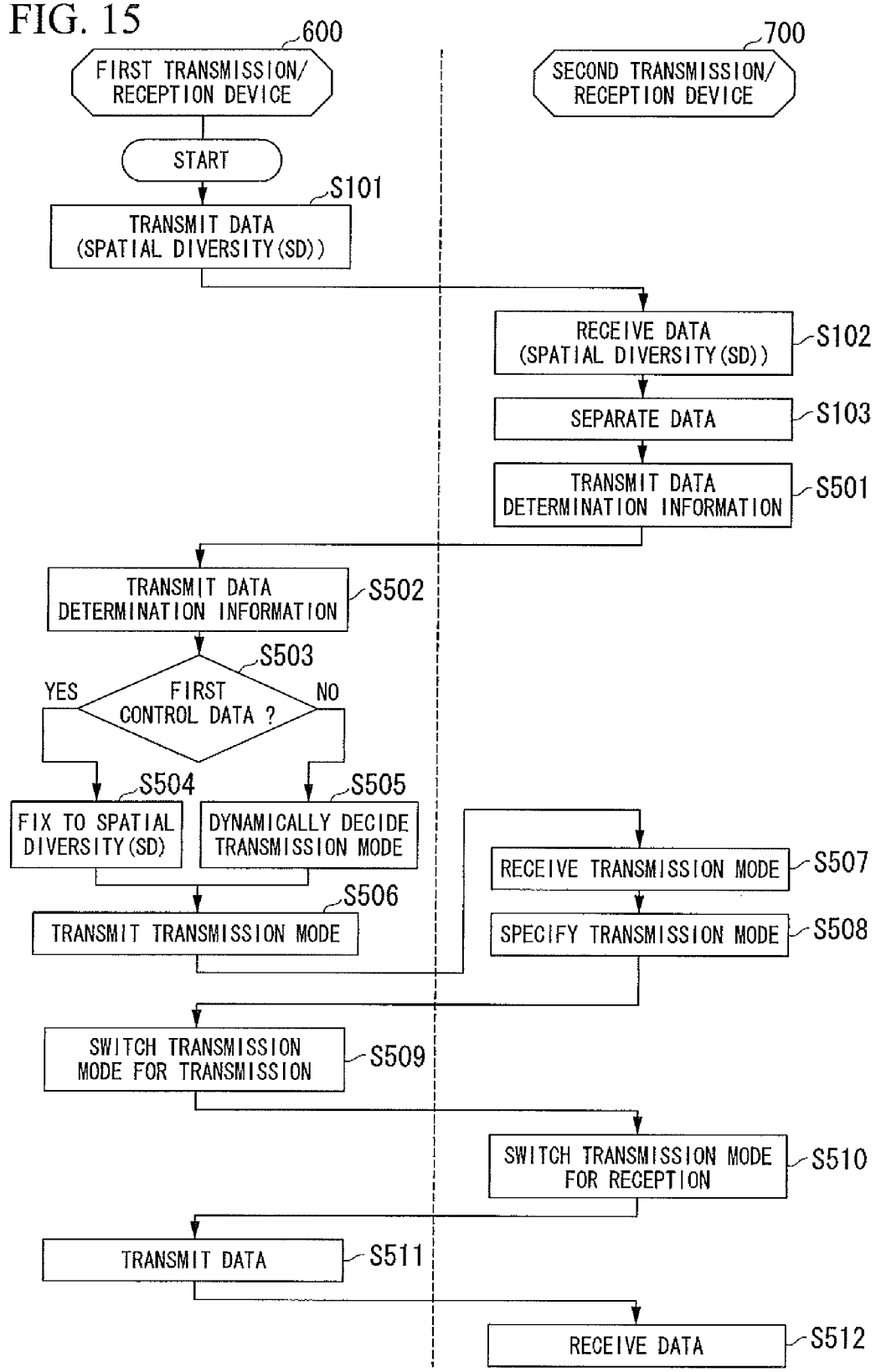

RADIO COMMUNICATION SYSTEM AND METHOD USING SPATIAL DIVERSITY AND SPATIAL MULTIPLEXING MODES

TECHNICAL FIELD

The present invention relates to a radio communication system, a reception device, a mobile station device, a transmission device, a base station device, a transmission/reception device control method, and a transmission/reception device control program.

Priority is claimed on Japanese Patent Application No. 2008-009451, filed on Jan. 18, 2008, the contents of which are incorporated herein by reference.

BACKGROUND ART

In recent years, 3rd generation mobile communication systems (3G) including a W-CDMA (Wideband-Code Division Multiple Access) scheme have been supplied worldwide. Additionally, next-generation mobile communication systems for implementing new high-speed communication are being studied. As the next-generation mobile communication systems, 4th generation mobile communication systems (4G) having a downstream communication rate of 100 Mbps to 1 Gbps are being studied.

However, 3G and 4G have a large difference in terms of the system configuration. To bridge the technical and temporal gap between 3G and 4G and implement a smooth transition to 4G, E-UTRA (Evolved Universal Terrestrial Radio Access), which implements a downstream communication rate of about 100 Mbps by employing the same frequency as in 3G and introducing a new technique as a candidate for 4G, is being actively discussed by 3GPP (3rd Generation Partnership Project).

In E-UTRA, which is the next-generation mobile communication system, an OFDMA (Orthogonal Frequency Division Multiple Access) scheme is adopted as that of the downlink. In E-UTRA, a technique called AMC (Adaptive Modulation and Coding), which adaptively changes a plurality of modulation schemes (modulation rates) or coding rates, is being adopted. Also, in E-UTRA, a MIMO (Multiple Input Multiple Output) transmission mode is adopted in which a plurality of antennas is provided at both sides of a transmission side and a reception side and data is transmitted/received using the plurality of antennas.

For the MIMO transmission mode, transmission modes such as spatial multiplexing (SM), beam forming (BF), and spatial diversity (single-stream transmit diversity mode) (SD) have been considered, and the switching for the three transmission modes has been proposed (Non-Patent Citation 1).

[Non-Patent Citation 1] 3GPP R1-060774 "Evaluation of Downlink MIMO Transmission Mode Selection"

[Non-Patent Citation 2] 3GPP TSG-Ran Working Group 1 Meeting #44, R1-060647, DL Adaptive STTD/SM Performance Evaluation for E-UTRA.

DISCLOSURE OF INVENTION

Technical Problem

However, a propagation path situation is severely changed in the case where a terminal device moves at high speed or in the case of an environment where a lot of shields are located as in an urban area. In the case where the propagation path situation is severely changed, a terminal device which switches a transmission mode may not select an appropriate transmission mode at the time of selecting a transmission mode for communication using little information obtained in a significantly short time. In particular, communication for a terminal device may be disconnected when there is little information for selecting a transmission mode immediately after the start of communication or immediately after the resumption of communication and the quality of communication may not be guaranteed without selection of an appropriate transmission mode.

The present invention has been made in view of the above-described points, and an object thereof is to provide a radio communication system, a reception device, a mobile station device, a transmission device, a base station device, a transmission/reception device control method, and a transmission/reception device control program which prevent a disconnection of communication even when a propagation path situation is severely changed.

Technical Solution (1) The present invention has been made to solve the above-described problem, and is a radio communication system including: transmission/reception devices which perform communication by dynamically switching a first transmission mode and a second transmission mode having a lower quality than the first transmission mode, wherein the transmission/reception devices have a transmission mode decision means which fixes a transmission mode upon communication to the first transmission mode for a given period of time.

In the present invention, the transmission mode for the given period of time is fixed to the quality-oriented first transmission mode. Thus, it is possible to prevent a disconnection of communication since communication for the period of time is performed by the quality-oriented mode without erroneously selecting a mode having a low communication quality. Since the transmission mode after the passage of the period of time is appropriately determined on the basis of a communication situation for the period of time, it is possible to prevent a disconnection of communication even after the passage of the period of time and prevent a decrease in transmission capacity.

(2) The transmission/reception devices may be transmission/reception devices which communicate control data and user data and first communicate the control data upon communication, the transmission/reception devices may further have a data determination means which determines the control data and the user data, and the transmission mode decision means may fix the transmission mode upon communication to the first transmission mode from the start of communication of first control data to the completion of communication of given control data or user data on the basis of a determination result of the data determination means.

In the present invention, the transmission mode for the period of time from the start of communication of the first control data to the completion of communication of the given control data or user data is fixed to the quality-oriented first transmission mode. Thus, it is possible to prevent the disconnection of communication since the communication of data is performed in the quality-oriented mode without erroneously selecting a mode having a low communication quality.

(3) The transmission/reception devices may be transmission/reception devices which communicate control data and user data, and first communicate the control data and next communicate first user data upon communication, the transmission/reception devices may further have a data determination means which determines the control data and the user data, and the transmission mode decision means may fix the transmission mode upon communication to the first transmission mode from the start of communication of the first user data to the completion of communication of given control data or user data on the basis of a determination result of the data determination means.

In the present invention, the transmission mode for the period of time from the start of communication of the first user data to the completion of communication of the given control data or user data is fixed to the quality-oriented first transmission mode. In general communication, it is not necessary to determine the transmission mode since the communication of control data is completed in a short time and communication is completed in a preset transmission mode immediately after the start of communication. Thus, the transmission/reception device may simplify a circuit or program for determining the transmission mode immediately after the start of communication.

(4) The transmission mode decision means may count communication data in a given unit, and may fix the transmission mode upon communication to the first transmission mode until the number of communication data counted from the start of communication reaches a given number.

(5) The transmission/reception devices may be transmission/reception devices which communicate control data and user data, and first communicate the control data and next communicate first user data upon communication, the transmission/reception devices may further have a data determination means which determines the control data and the user data, and the transmission mode decision means may count communication data in a given unit and fix the transmission mode upon communication to the first transmission mode until the number of communication data counted from the start of communication of the first user data determined by the data determination means reaches a given number.

(6) The radio communication system may further include: a time determination means which determines whether or not a given time has elapsed, the transmission mode decision means may fix the transmission mode upon communication to the first transmission mode until the given time determined by the time determination means has elapsed from the start of communication.

In the present invention, the transmission mode for the given time is fixed to the quality-oriented first transmission mode. Thus, it is possible to prevent a disconnection of communication since communication for the time is performed in the quality-oriented mode without erroneously selecting a mode having a low communication quality. Since a transmission mode after the time passage is appropriately determined on the basis of a communication situation for the time, it is possible to prevent the disconnection of communication even in the communication after the time passage and prevent a decrease in transmission capacity.

(7) The transmission/reception devices may be transmission/reception devices which communicate control data and user data, and first communicate the control data and next communicate first user data upon communication, the transmission/reception devices may further have: a time determination means which determines whether or not a given time has elapsed; and a data determination means which determines the control data and the user data, and the transmission mode decision means may fix the transmission mode upon communication to the first transmission mode until the given time determined by the time determination means has elapsed from the start of communication of the first user data determined by the data determination means.

(8) The transmission/reception devices may have a plurality of antennas and may use a multiple-input multiple-output technique.

(9) One of the transmission/reception devices may be a base station device which communicates with a plurality of mobile station devices and the other may be a mobile station device.

(10) The present invention is a radio communication system which performs transmission from a first transmission/reception device having a plurality of transmit antennas to a second transmission/reception device by dynamically switching between a plurality of transmission modes including spatial diversity and spatial multiplexing, including: performing, by the first transmission/reception device, transmission by the spatial diversity after the start of communication; changing a transmission mode after transmission mode information indicating the changed transmission mode is transmitted to the second transmission/reception device when the transmission mode is changed; performing, by the second transmission/reception device, reception by the spatial diversity after the start of communication; and changing the transmission mode according to the transmission mode information after the transmission mode information is received.

(11) The present invention is a radio communication system which performs transmission from a first transmission/reception device having a plurality of transmit antennas to a second transmission/reception device by dynamically switching between a plurality of transmission modes including spatial diversity and spatial multiplexing, including: performing, by the first transmission/reception device, transmission by the spatial diversity until the communication of given control data is completed after the start of communication; changing a transmission mode after transmission mode information indicating the changed transmission mode is transmitted to the second transmission/reception device when the transmission mode is changed; performing, by the second transmission/reception device, reception by the spatial diversity until the communication of the given control data is completed; and changing the transmission mode according to the transmission mode information after the transmission mode information is received.

(12) In the transmission/reception device, the start of communication may include the case where the communication is temporarily interrupted and thereafter resumed.

(13) The present invention is a reception device which performs reception by dynamically switching a first transmission mode and a second transmission mode having a lower quality than the first transmission mode, including: a transmission mode decision means which fixes a transmission mode upon reception to the first transmission mode for a given period of time.

(14) The present invention is a mobile station device in a communication system which performs transmission from a base station device having a plurality of transmit antennas to a mobile station device by dynamically switching between a plurality of transmission modes including spatial diversity and spatial multiplexing, including: performing reception by the spatial diversity after the start of communication; and changing a transmission mode according to transmission mode information after receiving the transmission mode information indicating the changed transmission mode from the base station device.

(15) The present invention is a mobile station device in a communication system which performs transmission from a base station device having a plurality of transmit antennas to a mobile station device by dynamically switching between a plurality of transmission modes including spatial diversity and spatial multiplexing, including: performing reception by the spatial diversity until the communication of given control data is completed after the start of communication; and changing a transmission mode according to transmission mode information after receiving the transmission mode information indicating the changed transmission mode from the base station device.

(16) In the mobile station device, the start of communication may include the case where the communication is temporarily interrupted and thereafter resumed.

(17) The present invention is a transmission device which performs transmission by dynamically switching a first transmission mode and a second transmission mode having a lower quality than the first transmission mode, including: a transmission mode decision means which fixes a transmission mode upon transmission to the first transmission mode for a given period of time.

(18) The present invention is a base station device having a plurality of transmit antennas which performs transmission to a mobile station device by dynamically switching between a plurality of transmission modes including spatial diversity and spatial multiplexing, including: performing transmission by the spatial diversity after the start of communication; and changing a transmission mode according to transmission mode information after transmitting the transmission mode information indicating the changed transmission mode to the mobile station device when the transmission mode is changed.

(19) The present invention is a base station device having a plurality of transmit antennas which performs transmission to a mobile station device by dynamically switching between a plurality of transmission modes including spatial diversity and spatial multiplexing, including: performing transmission by the spatial diversity until the communication of given control data is completed after the start of communication; and changing a transmission mode according to transmission mode information indicating the changed transmission mode after the transmission mode information is transmitted to the mobile station device when the transmission mode is changed.

(20) In the base station device, the start of communication may include the case where the communication is temporarily interrupted and thereafter resumed.

(21) The present invention is a control method of a transmission/reception device which performs communication by dynamically switching a first transmission mode and a second transmission mode having a lower quality than the first transmission mode, including: a process of fixing a transmission mode upon communication to the first transmission mode for a given period of time.

(22) The present invention is a transmission/reception device control program causing a computer of a transmission/reception device, which performs communication by dynamically switching a first transmission mode and a second transmission mode having a lower quality than the first transmission mode, to execute: means which fixes a transmission mode upon communication to the first transmission mode for a given period of time.

Advantageous Effects

According to the present invention, a transmission mode for a given period of time is fixed to a quality-oriented transmission mode, thereby preventing a disconnection of communication without erroneously selecting a mode having a low communication quality. Since a transmission mode after the passage of the period of time is appropriately determined on the basis of a communication situation for the period of time, it is possible to prevent the disconnection of communication even in the communication after the passage of the period of time and prevent a decrease in transmission capacity.

BRIEF DESCRIPTION OF DRAWINGS

FIG. 3 is a diagram illustrating a method of switching a transmission mode according to the first embodiment of the present invention.

FIG. 4 is a flow diagram according to the first embodiment of the present invention.

FIG. 6 is a diagram illustrating a method of switching a transmission mode according to the second embodiment of the present invention.

FIG. 15 is a flow diagram according to the fifth embodiment of the present invention.

EXPLANATION OF REFERENCE 100, 600: FIRST TRANSMISSION/RECEPTION DEVICE
101: ANTENNA UNIT
111: TRANSMISSION UNIT
112: TRANSMISSION MODE SWITCHING MEANS
113: TRANSMISSION DATA STREAM GENERATION MEANS
121, 621: CONTROL UNIT
622: TRANSMISSION MODE DECISION MEANS
131: RECEPTION UNIT
141: STORAGE UNIT
133: DATA STREAM SEPARATION MEANS
200, 300, 400, 500, 700: SECOND TRANSMISSION/RECEPTION DEVICE
201: ANTENNA UNIT
211: TRANSMISSION UNIT

213: TRANSMISSION DATA STREAM GENERATION MEANS
221, 321, 421, 521, 721: CONTROL UNIT
222, 322, 422, 522: TRANSMISSION MODE DECISION MEANS
223, 323, 423, 523: DATA DETERMINATION MEANS
231: RECEPTION UNIT
232: TRANSMISSION MODE SWITCHING MEANS
233: DATA STREAM SEPARATION MEANS
241: STORAGE UNIT

BEST MODE FOR CARRYING OUT THE INVENTION

First Embodiment

Hereinafter, a radio communication system, a reception device, a mobile station device, a transmission device, a base station device, a transmission/reception device control method, and a transmission/reception device control program of the present invention will be described by embodiments with reference to the drawings.

In this embodiment, a first transmission/reception device 100 and a second transmission/reception device 200 are able to switch spatial diversity (SD) as a quality-oriented transmission mode, and spatial multiplexing (SM) and beam forming (BF) as transmission modes having a lower quality than the spatial diversity (SD).

Here, the spatial diversity (SD) is the transmission mode in which the same data is transmitted from a plurality of antennas of a transmission side and a reception side performs reception by a plurality of antennas. When the transmission mode is the spatial diversity (SD), the reception side is able to increase accuracy by combining a plurality of received data. The spatial multiplexing (SM) is the transmission mode in which different data is transmitted from a plurality of antennas of a transmission side and a reception side performs reception by a plurality of antennas. Also, the beam forming (BF) is the transmission mode in which data is efficiently transmitted by changing a phase of a transmission radio wave and controlling a transmission direction of the radio wave.

As compared to the spatial multiplexing (SM) and the beam forming (BF), the transmission mode by the spatial diversity (SD) has a high communication quality and is effective in a situation where a radio wave environment is poor.

In this embodiment, the transmission/reception device fixes the transmission mode to the spatial diversity (SD) from the start of communication of first control data to the completion of reception. In addition, the transmission mode immediately after the start of communication is decided as the spatial diversity (SD).

Figure 1:
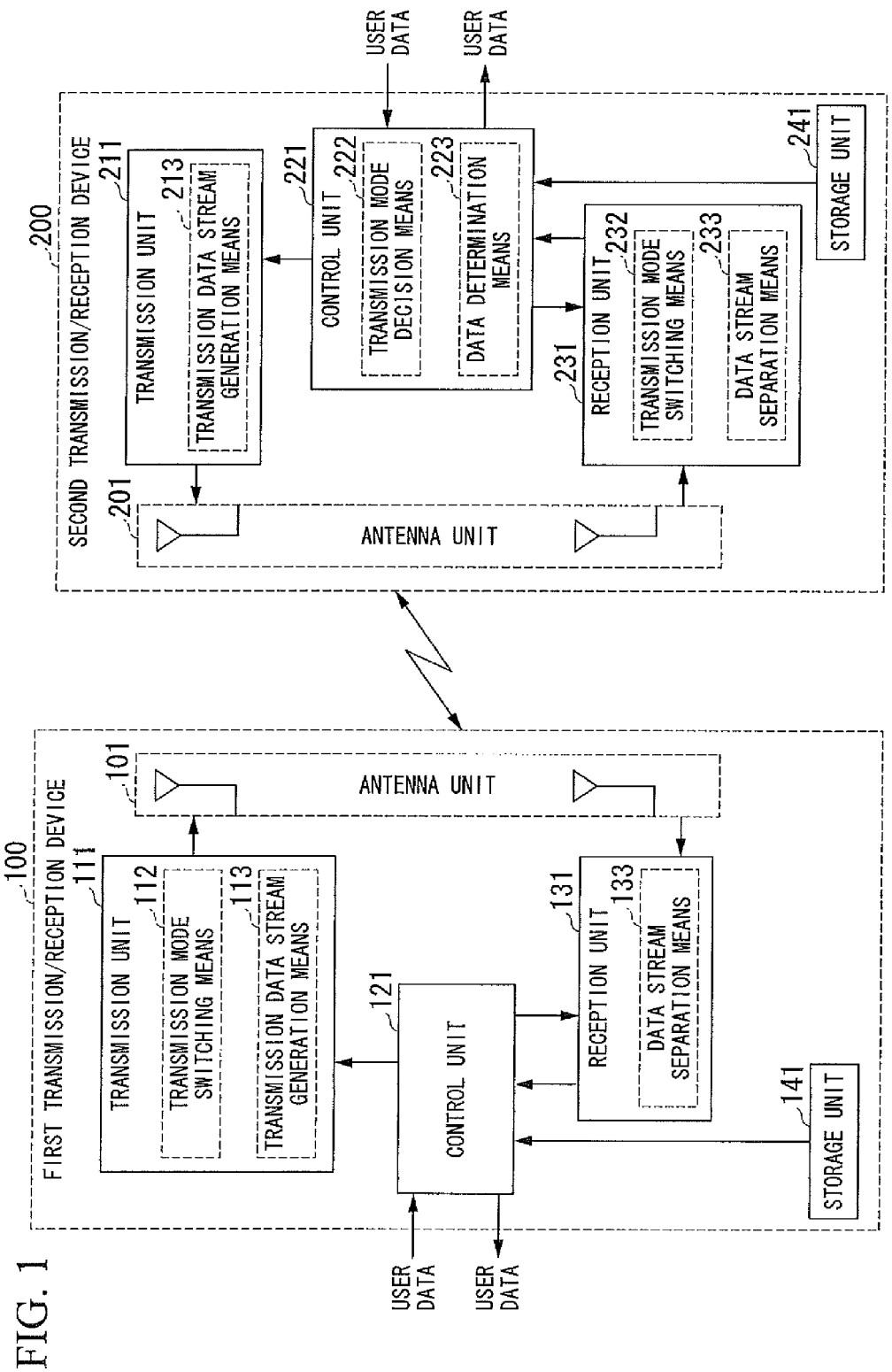
FIG. 1 is a block diagram of transmission/reception devices according to a first embodiment of the present invention.

FIG. 1 is a block diagram showing an outline of the first embodiment related to a radio transmission/reception system which performs data communication from a first transmission/reception device 100 to a second transmission/reception device 200 applicable to the practice of the present invention. In this embodiment, an antenna unit 101 of the first transmission/reception device 100 as a base station device and an antenna unit 201 of the second transmission/reception device 200 as a mobile station device are set to have two antennas.

The first transmission/reception device 100 communicates a data stream to be transmitted from an antenna unit 101 to an antenna unit 201 of the second transmission/reception device 200 in the transmission mode of one of the spatial diversity SD, the spatial multiplexing (SM), and the beam forming (BF).

In communication from the antenna unit 101 of the first transmission/reception device 100 to the antenna unit 201 of the second transmission/reception device 200, a communication scheme is set as OFDMA, which is a multiple access scheme. Communication from the antenna unit 201 of the second transmission/reception device 200 to the antenna unit 101 of the first transmission/reception device 100 uses a communication scheme as SC-FDMA (Single Carrier-Frequency Division Multiple Access). The communication scheme from the first transmission/reception device 100 to the second transmission/reception device 200 and the communication scheme from the second transmission/reception device 200 to the first transmission/reception device 100 may be identical or different. The communication scheme is not limited to the above-described communication schemes, and other communication schemes such as CDMA (Code Division Multiple Access) may be used.

First, the first transmission/reception device 100 will be described. The first transmission/reception device 100 includes the antenna unit 101, a transmission unit 111, a control unit 121, a reception unit 131, and a storage unit 141.

The antenna unit 101 has two antennas and has a function of transmitting a signal input from the transmission unit 111 to the second transmission/reception device 200 and a function of receiving a signal transmitted from the second transmission/reception device 200 and outputting the received signal to the reception unit 131.

The reception unit 131 includes a data stream separation means 133 which demodulates the received signal input from the antenna unit 101 and separates user data, control data, and the like from a demodulated received data stream, and has a function of outputting the separated data stream to the control unit 121.

The control data is data for controlling the transmission/reception of communication or a transmission/reception device, and the user data is data other than the control data. Specifically, the control data is L1/L2 control data (Layer 1/Layer 2 control data) or data of a control channel to be allocated to a given OFDM symbol, and the user data is voice data or an HTTP (HyperText Transfer Protocol) request. However, the control data is not limited to the above-described data.

The control unit 121 specifies a transmission mode which is included in data input from the reception unit 131 and is decided by the second transmission/reception device 200, and outputs the transmission mode information as a transmission mode to be used at the time of transmission by the first transmission/reception device 100 to the transmission unit 111. In this regard, the control unit 121 outputs the above-described transmission mode to the transmission unit 111 at a synchronous timing to be described later on the basis of a transmission cycle which is a given time interval stored in the storage unit 141. Immediately after the start of communication, the control unit 121 sets the transmission mode information as the spatial diversity (SD).

The control unit 121 outputs user data input from the reception unit 131 to other peripheral circuits provided in the first transmission/reception device 100, and outputs user data and control data input from the peripheral circuits to the transmission unit 111.

The transmission unit 111 includes a transmission mode switching means 112 which switches the transmission mode to the spatial multiplexing (SM), the spatial diversity (SD), or the beam forming (BF) according to the transmission mode information input from the control unit 121. The transmission unit 111 includes a transmission data stream generation means 113 which multiplexes user data, control data, and the like to be transmitted that has been obtained from the control unit 121, and generates a transmission data stream, in response to the switched transmission mode.

The transmission unit 111 has a function of modulating the generated transmission data stream and transmitting the modulated transmission data stream to the second transmission/reception device 200 via the antenna unit 101 by performing up-conversion into a radio frequency. At this time, the transmission data stream is separated for each transmission cycle described above (hereinafter, referred to as transmission cycle data) and is transmitted in time series. Transmission data within the same transmission cycle is transmitted in the same transmission mode.

Figure 2:
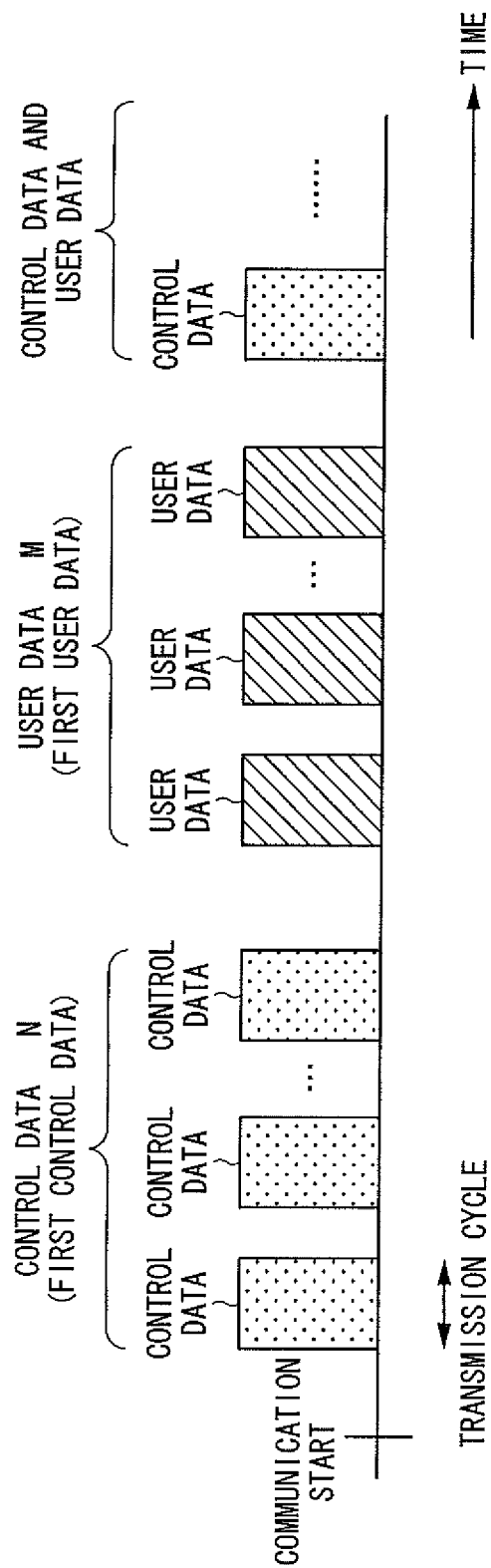
FIG. 2 is a diagram illustrating transmitted signals according to the first embodiment of the present invention.

FIG. 2 is a schematic diagram showing signals transmitted by the above-described transmission unit 111. In FIG. 2, the horizontal axis is the time. First control data is transmitted after the start of communication, first user data is next transmitted, and control data or user data is thereafter received. Here, the first control data comprise N transmission cycle data, and the user data comprise M transmission cycle data.

Next, the second transmission/reception device 200 will be described. The second transmission/reception device 200 includes the antenna unit 201, a transmission unit 211, a control unit 221, a reception unit 231, and a storage unit 241.

The antenna unit 201 includes two antennas, and has a function of receiving a signal transmitted from the first transmission/reception device 100, down-converting the signal into a baseband, and outputting the down-converted signal to the reception unit 231 and a function of transmitting a signal input from the transmission unit 211 to the first transmission/reception device 100.

The reception unit 231 includes a transmission mode switching means 232 which switches the transmission mode to the spatial multiplexing (SM), the spatial diversity (SD), or the beam forming (BF) according to transmission mode information input from the control unit 221, and demodulates the received signal input from the antenna unit 201 in the switched transmission mode. Also, the reception unit 231 includes a data stream separation means 233 which separates user data, control data, and the like from a received data stream of the demodulated received signal. The reception unit 231 has a function of outputting the separated data stream to the control unit 221.

Specifically, the data stream separation means 233 separates the control data and the user data by specifying an OFDM symbol to which a control channel is arranged by information of a control format indicator channel arranged to a given subcarrier of a predetermined OFDM symbol and setting the data arranged to the OFDM symbol as the control data.

The control unit 221 has a data determination means 223 and a transmission mode decision means 222, and determines the transmission mode in response to a communication situation.

The data determination means 223 determines whether or not received data is first control data after the start of communication, and fixes the transmission mode to the spatial diversity (SD) when the received data is the first control data.

When the received data is not the first control data, that is, when the user data is included in the received data, the transmission mode decision means 222 decides the transmission mode as one of the spatial multiplexing (SM), the spatial diversity (SD), and the beam forming (BF) (hereinafter, referred to as dynamic decision). Thereafter, the transmission mode decision means 222 decides the transmission mode by the above-described dynamic decision since the received data is not the first control data even though the received data is the control data.

For example, there is a method of making a determination by an SNR (Signal to Noise Ratio) as a dynamic decision method. Specifically, the transmission mode decision means 222 compares the SNR to a predetermined given threshold value stored in the storage unit 241, sets the transmission mode as the spatial multiplexing (SM) when the SNR is equal to or greater than the given threshold value, and sets the transmission mode as the spatial diversity (SD) when the SNR is less than the given threshold value.

However, the dynamic decision method is not limited to the above-described method, and may be a method of selecting a transmission mode suitable for a channel model by estimating the channel model by a condition number Kc of a channel matrix H, and deciding a transmission mode in which SE (Spectral Efficiency) becomes maximal. Specifically, a maximum value $1_{max}$(H) and a minimum value $1_{min}$(H) of a singular value of the channel matrix H may be calculated, the condition number Kc=$1_{max}$(H)/Minimum Value $1_{min}$(H) may be calculated, and the spatial multiplexing (SM) may be decided when Kc≤2, the spatial diversity (SD) may be decided when 2<Kc<20, and the beam forming (BF) may be decided when Kc≥20 (Non-Patent Citation 2).

The control unit 221 outputs information of the transmission mode fixed or decided by the transmission mode decision means 222 to the transmission unit 211. Also, the control unit 221 outputs the above-described transmission mode to the transmission mode switching means 232 at a synchronous timing based on a transmission cycle which is a given time interval stored in the storage unit 241. In this regard, the control unit 221 sets the transmission mode information immediately after the start of communication as the spatial diversity (SD).

The control unit 221 outputs user data input from the reception unit 231 to other peripheral circuits provided in the second transmission/reception device 200, and outputs user data and control data input from peripheral circuits to the transmission unit 211.

The transmission unit 211 has a transmission data stream generation means 213, and has a function of multiplexing user data and control data input from the control unit 221 and generating a transmission data stream. Also, the transmission unit 211 transmits the generated transmission data stream to the first transmission/reception device 100 via the antenna unit 201. In this embodiment, the transmission mode information input from the control unit 221 is transmitted as control data, but is not limited thereto.

Hereinafter, a relationship between communication data and communication schemes will be specifically described. FIG. 3 is a schematic diagram illustrating a method of switching a transmission mode of this embodiment. In FIG. 3, the horizontal axis is the time.

FIG. 3(a) is a diagram showing a data stream in which first control data including three transmission cycle data is received from the first transmission/reception device 100 after the second transmission/reception device 200 starts communication with the first transmission/reception device 100, first user data including one transmission cycle data is next received, and control data is thereafter received.

FIG. 3(b) is a diagram showing a data stream in which first control data including one transmission cycle data is received from the first transmission/reception device 100 after the second transmission/reception device 200 starts communication with the first transmission/reception device 100, first user data including three transmission cycle data is next received, and control data is thereafter received.

FIG. 3(c) is a diagram showing a data stream in which first control data including one transmission cycle data is received from the first transmission/reception device 100 after the second transmission/reception device 200 starts communication with the first transmission/reception device 100, first user data including one transmission cycle data is next received, and transmission cycle data of control data and user data is thereafter alternately received.

Here, the storage unit 141 of the first transmission/reception device 100 and the storage unit 241 of the second transmission/reception device 200 store a transmission cycle which is a given time interval indicated by a triangle mark. After the start of communication, the control unit 121 of the first transmission/reception device 100 and the control unit 221 of the second transmission/reception device 200 respectively output the determined transmission mode information to the transmission mode switching means 112 and the transmission mode switching means 232 in synchronization with a timing (hereinafter, referred to as synchronous timing) when a transmission cycle stored in the storage unit 141 of the first transmission/reception device 100 and the storage unit 241 of the second transmission/reception device 200 has elapsed as indicated by the triangle mark of FIG. 3.

In FIG. 3, one transmission cycle data is constituted only by control data or user data, but the present invention is not limited thereto and control data and user data may be included therein.

Next, a range in which the transmission mode decision means 222 fixes the transmission mode to the spatial diversity (SD) and a range in which the transmission mode of communication from the first transmission/reception device 100 to the second transmission/reception device 200 is fixed to the spatial diversity (SD) will be described.

In (a-1) of FIG. 3, first transmission cycle data is communicated by the spatial diversity (SD), which is a predetermined transmission mode immediately after the start of communication. The communication in the transmission mode is in a range indicated by the dotted-line arrow of (a-1) of FIG. 3.

The first transmission cycle data is control data which constitutes first control data after the start of communication. Accordingly, the transmission mode decision means 222 fixes the transmission mode to the spatial diversity (SD). On the basis of the fixation, second transmission cycle data is communicated in the transmission mode by the spatial diversity (SD).

The second transmission cycle data is also control data which is the first control data. Accordingly, the transmission mode decision means 222 fixes the transmission mode to the spatial diversity (SD). On the basis of the fixation, third transmission cycle data is communicated in the transmission mode by the spatial diversity (SD). Likewise, the third transmission cycle data is also control data which is the first control data. Accordingly, the transmission mode decision means 222 fixes the transmission mode to the spatial diversity (SD). On the basis of the fixation, fourth transmission cycle data is communicated in the transmission mode by the spatial diversity (SD).

Since the fourth transmission cycle data is user data, not control data, the first control data is data to the third transmission cycle data. Accordingly, the transmission mode decision means 222 decides a transmission mode for transmission cycle data after the fourth by the above-described dynamic decision. On the basis of the decision, the first transmission/reception device 100 and the second transmission/reception device 200 switch the transmission mode to the decided transmission mode at the next synchronous timing.

A range in which the transmission mode decision means 222 fixes the transmission mode to the spatial diversity (SD) is indicated by the solid-line arrow of (a-1) of FIG. 3. A range in which the transmission mode of communication from the first transmission/reception device 100 to the second transmission/reception device 200 is fixed to the spatial diversity (SD) is indicated by the dashed-line arrow of (a-1) of FIG. 3.

Likewise, in the cases of (b-1) and (c-1) of FIG. 3, a range in which the transmission mode decision means 222 fixes the transmission mode to the spatial diversity (SD) is indicated by the solid-line arrow. A range in which the transmission mode of communication from the first transmission/reception device 100 to the second transmission/reception device 200 is fixed to the spatial diversity (SD) is indicated by the dashed-line arrow. Ranges indicated by the dotted-line arrows of (b-1) and (c-1) of FIG. 3 are those in which the spatial diversity (SD) is set after the start of communication.

The transmission mode decision means 222 may counts the number of transmission cycle data and decide the transmission mode as the spatial diversity (SD) until the counted number reaches a preset number.

(a-3) of FIG. 3 is the case where the above-described preset number is 2. First transmission cycle data is communicated in the spatial diversity (SD) which is a predetermined transmission mode immediate after the start of communication. Communication in the transmission mode is in a range indicated by the dotted-line arrow of (a-3) of FIG. 3.

When the first transmission cycle data is input, the transmission mode decision means 222 sets the number of transmission cycle data as 1. Since the number of transmission cycle data has not reached the preset number, 2, the transmission mode decision means 222 fixes the transmission mode to the spatial diversity (SD). On the basis of the fixation, second transmission cycle data is communicated in the transmission mode by the spatial diversity (SD).

In the transmission mode decision means 222, the number of transmission cycle data becomes 2 when the second transmission cycle data is input. Since the number of transmission cycle data has reached the preset number, 2, the transmission mode decision means 222 decides a subsequent transmission mode by the above-described dynamic decision. On the basis of the decision, the first transmission/reception device 100 and the second transmission/reception device 200 switch the transmission mode to the decided transmission mode at the next synchronous timing.

Thereby, a range in which the transmission mode decision means 222 fixes the transmission mode to the spatial diversity (SD) is indicated by the solid-line arrow of (a-3) of FIG. 3. A range in which the transmission mode of communication from the first transmission/reception device 100 to the second transmission/reception device 200 is fixed to the spatial diversity (SD) is indicated by the dashed-line arrow of (a-3) of FIG. 3.

Likewise, (a-2) of FIG. 3 is the case where the above-described preset number is 1.

In this embodiment, a unit of counting data is a transmission cycle, but the present invention is not limited thereto. For example, it may be a given data length and may be a slot which is a specific time length.

Next, the operation will be described. FIG. 4 is a flow diagram showing the operation of this embodiment.

First, the first transmission/reception device 100 transmits data by the spatial diversity (SD), which is the transmission mode immediately after the start of communication (S101).

The second transmission/reception device 200 receives a signal transmitted from the first transmission/reception device 100 by the antenna unit 201, and outputs the received signal to the reception unit 231 (S102). The reception unit 231 demodulates the received signal received by the spatial diversity (SD) which is the transmission mode immediately after the start of communication, separates a demodulated received data stream into user data and control data, and outputs the separated data to the control unit 221 (S103).

The control unit 221 determines a type of the received data and decides the transmission mode. Specifically, the data determination means 223 of the control unit 221 determines whether or not the input data is first control data after the start of communication (S104). The transmission mode decision means 222 fixes the transmission mode to the spatial diversity (SD) when it is the first control data, (S105), and decides the transmission mode using the above-described dynamic decision method when it is not the first control data (S106).

The control unit 221 outputs the fixed or decided transmission mode information to the transmitting unit 211. The transmission unit 211 generates the transmission mode information fixed in step S105 or decided in step S106 as a data stream by the transmission data stream generation means 213, and transmits the generated information to the first transmission device 100 (S107).

Next, the first transmission/reception device 100 receives a signal transmitted from the transmission device 200 by the antenna unit 101, and outputs the received signal to the reception unit 131. The reception unit 131 demodulates the received signal, separates a demodulated received data stream into user data and control data, and outputs the separated data to the control unit 121 (S108). The control unit 121 specifies the transmission mode information fixed in step S105 or decided in S106 from the input control data (S109).

The control unit 121 outputs the transmission mode information fixed in step S105 or decided in step S106 to the transmission unit 111 in synchronization with a synchronous timing based on the transmission cycle stored in the storage unit 141. According to the transmission mode information input from the control unit 121, the transmission mode switching means 112 of the transmission unit 111 switches the transmission mode in which transmission is performed to the spatial multiplexing (SM), the spatial diversity (SD), or the beam forming (BF) (S110).

On the other hand, the control unit 221 included in the second transmission/reception device 200 outputs the transmission mode information fixed in step S105 or decided in step S106 to the reception unit 231 at the synchronous timing based on the transmission cycle stored in the storage unit 241. According to the transmission mode information input from the control unit 221, the reception unit 231 switches the transmission mode in which reception is performed to the spatial multiplexing (SM), the spatial diversity (SD), or the beam forming (BF) (S111). It is possible to perform communication in which the transmission modes of the first transmission/reception device 100 and the second transmission/reception device 200 are unified.

The transmission unit 111 provided in the first transmission/reception device 100 transmits data to the second transmission/reception device 200 via the antenna 101 in the transmission mode of the transmission mode information (S112). The reception unit 231 of the second transmission/reception device 200 receives and demodulates a transmitted signal from the first transmission/reception device 100 via the antenna 201 in the same transmission mode as in the first transmission/reception device 100 (S113).

According to this embodiment, the transmission/reception device performs communication by fixing the transmission mode to the spatial diversity (SD), which is a quality-oriented transmission mode, from the start of communication to the transmission of control data.

Thereby, the transmission/reception device is able to prevent a disconnection of communication since communication for that period of time is performed in a quality-oriented mode without erroneously selecting a mode having a low communication quality. Since it is possible to appropriately determine a transmission mode after the passage of the period of time on the basis of a communication situation for the period of time, a disconnection of communication may be prevented even in the communication after the passage of the period of time and a decrease in transmission capacity may be prevented.

Second Embodiment

The transmission/reception device of the first embodiment fixes the transmission mode to the spatial diversity (SD) from the start of communication of first control data to the completion of reception of first control data, but the transmission/reception device of this embodiment fixes the transmission mode to the spatial diversity (SD) from the start of communication of first control data to the completion of reception of first user data.

Figure 5:
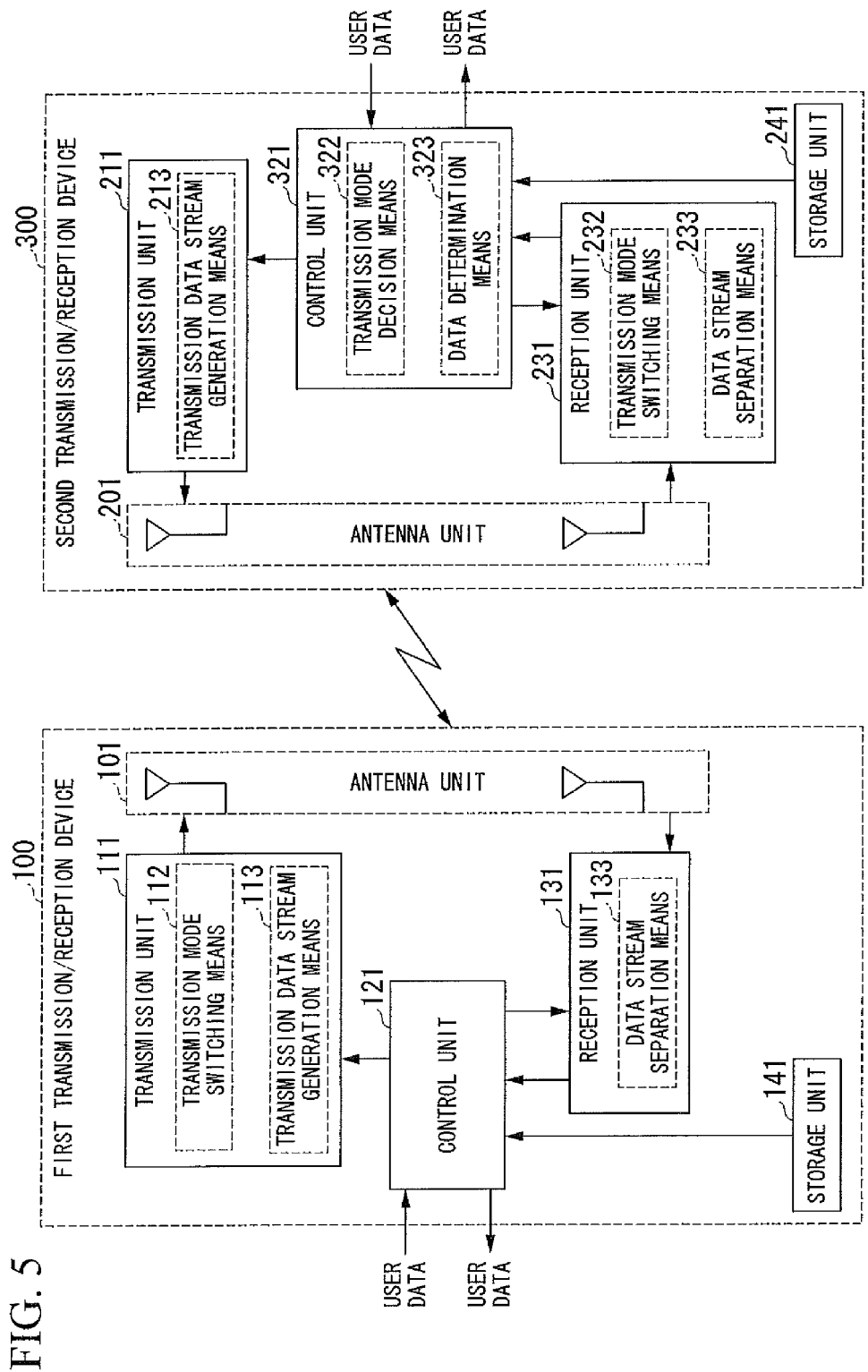
FIG. 5 is a block diagram of transmission/reception devices according to a second embodiment of the present invention.

FIG. 5 is a schematic block diagram showing the configuration of a first transmission/reception device 100 and a second transmission/reception device 300 of this embodiment. When this embodiment is compared to the first embodiment, a control unit 321 is different. However, since a function provided in each element thereof is the same as in the first embodiment, description of the same function as in the first embodiment is omitted.

The control unit 321 has a data determination means 323 and a transmission mode decision means 322, and decides a transmission mode according to each communication situation.

The data determination means 323 determines whether or not received data is first control data after the start of communication. When it is the first control data, the transmission mode decision means 322 fixes the transmission mode to the spatial diversity (SD). Next, even when received data is not the first control data, that is, even when user data is included in the received data, the transmission mode decision means 322 decides the transmission mode as the spatial diversity (SD). Thereafter, the transmission mode is fixed to the spatial diversity (SD) when user data is continuous as received data, and the transmission mode is decided by the above-described dynamic decision when control data is included in received data. Thereafter, since received data is not the first control data even though the received data is control data and received data is not the first user data even though the received data is user data, the transmission mode is decided by the above-described dynamic decision method.

The control unit 321 outputs information of the above-described transmission mode decided by the transmission mode decision means 322 to the transmission unit 211. Also, the control unit 321 outputs the above-described transmission mode to the transmission mode switching means 332 at a synchronous timing based on a given transmission cycle stored in the storage unit 241. In this regard, the control unit 321 sets the transmission mode information immediately after the start of communication as the spatial diversity (SD).

The control unit 321 outputs user data input from the reception unit 231 to other peripheral circuits provided in the second transmission/reception device 300, and outputs user data and control data input from peripheral circuits to the transmission unit 211.

Hereinafter, a relationship between communication data and communication schemes will be specifically described. FIG. 6 is a schematic diagram illustrating a method of switching a transmission mode of this embodiment. In FIG. 6, the horizontal axis is the time. Since data shown in FIGS. 6(a) to (c) is the same as shown in FIGS. 3(a) to (c), description thereof is omitted.

A range in which the transmission mode decision means 322 fixes the transmission mode to the spatial diversity (SD) and a range in which the transmission mode of communication from the first transmission/reception device 100 to the second transmission/reception device 300 is fixed to the spatial diversity (SD) will be described.

In (a-1) of FIG. 6, first transmission cycle data is communicated by the spatial diversity (SD) which is a predetermined transmission mode to be used immediately after the start of communication. The communication in the transmission mode is in a range indicated by the dotted-line arrow of (a-1) of FIG. 3.

The first transmission cycle data is control data which constitutes first control data after the start of communication. Accordingly, the transmission mode decision means 322 fixes the transmission mode to the spatial diversity (SD). On the basis of the fixation, second transmission cycle data is communicated in the transmission mode by the spatial diversity (SD).

The second transmission cycle data is also control data which is the first control data. Accordingly, the transmission mode decision means 322 fixes the transmission mode to the spatial diversity (SD). On the basis of the fixation, third transmission cycle data is communicated in the transmission mode by the spatial diversity (SD). Likewise, the third transmission cycle data is also control data which is the first control data. Accordingly, the transmission mode decision means 322 fixes the transmission mode to the spatial diversity (SD). On the basis of the fixation, fourth transmission cycle data is communicated in the transmission mode by the spatial diversity (SD).

The fourth transmission cycle data is user data, not control data, but the fourth transmission cycle data constitutes first user data after the start of communication. Accordingly, the transmission mode decision means 322 fixes the transmission mode to the spatial diversity (SD). On the basis of the fixation, fifth transmission cycle data is communicated in the transmission mode by the spatial diversity (SD).

Next, since the fifth transmission cycle data is control data, not user data, the first control data and the first user data is data to the fourth transmission cycle data. Accordingly, for transmission cycle data after the fifth, the transmission mode decision means 322 decides the transmission mode by the above-described dynamic decision. On the basis of the decision, the first transmission/reception device 100 and the second transmission/reception device 300 switch the transmission mode to the decided transmission mode at the next synchronous timing.

A range in which the transmission mode decision means 322 fixes the transmission mode to the spatial diversity (SD) is indicated by the solid-line arrow of (a-1) of FIG. 6. A range in which the transmission mode of communication from the first transmission/reception device 100 to the second transmission/reception device 300 is fixed to the spatial diversity (SD) is indicated by the dashed-line arrow of (a-1) of FIG. 6.

Likewise, in the cases of (b-1) and (c-1) of FIG. 6, a range in which the transmission mode decision means 322 fixes the transmission mode to the spatial diversity (SD) is indicated by the solid-line arrow. A range in which the transmission mode of communication from the first transmission/reception device 100 to the second transmission/reception device 300 is fixed to the spatial diversity (SD) is indicated by the dashed-line arrow. Ranges indicated by the dotted-line arrows of (b-1) and (c-1) of FIG. 6 are those in which the spatial diversity (SD) is set immediately after the start of communication.

Figure 7:
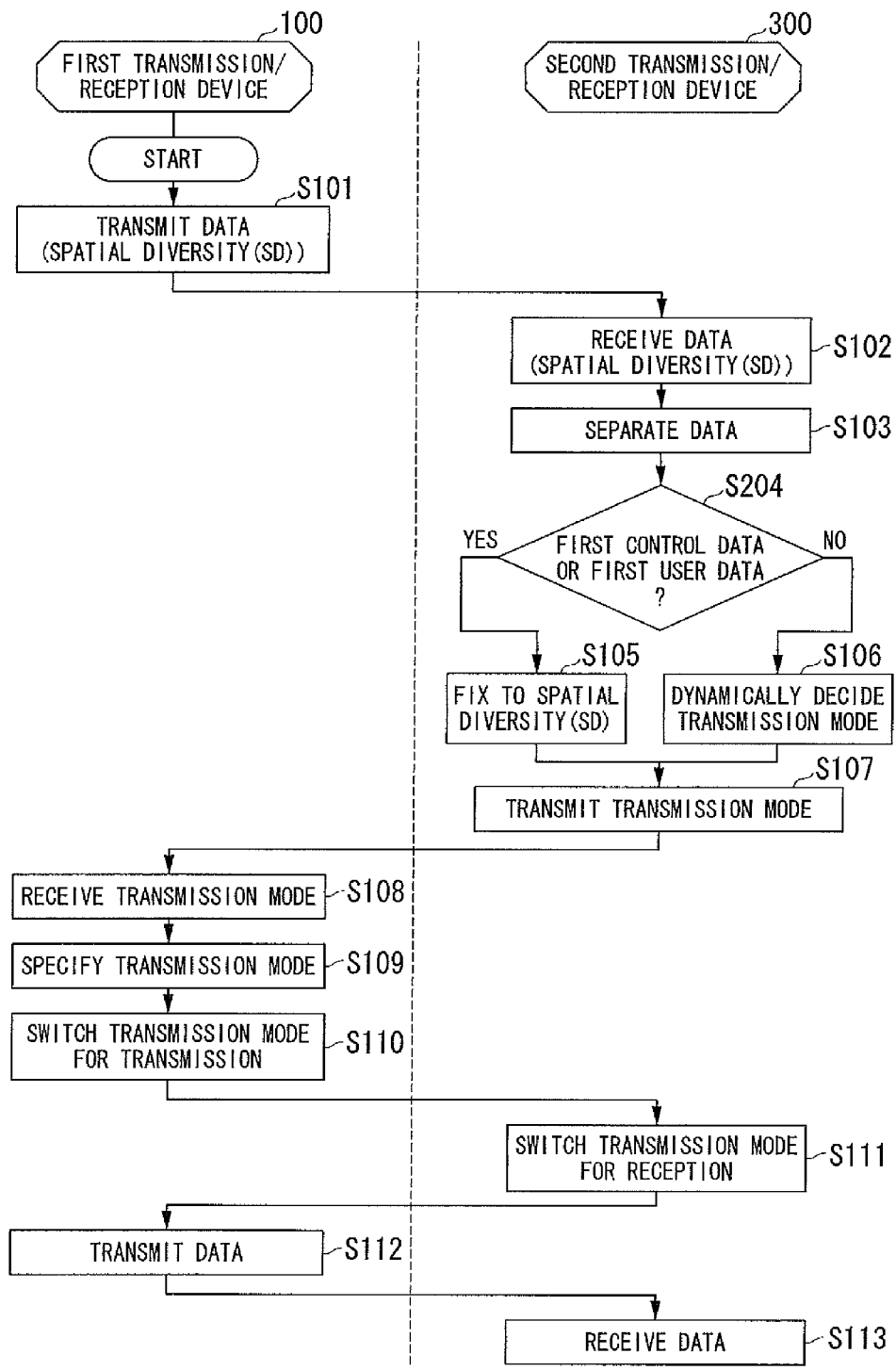
FIG. 7 is a flow diagram according to the second embodiment of the present invention.

Next, the operation will be described. FIG. 7 is a flow diagram showing the operation of this embodiment. As the operation of this embodiment is compared to that of the first embodiment, the determination method of S204 is different. However, since the other operations are the same as in the first embodiment, description of the same operations as in the first embodiment is omitted.

In this embodiment, the data determination means 323 of the control unit 321 determines whether or not input data after the start of communication is first control data or first user data (S204). The transmission mode decision means 322 fixes the transmission mode to the spatial diversity (SD) when it is the first control data (S105), and decides the transmission mode by the above-described dynamic decision method when it is not the first control data (S106).

From the above, the transmission/reception device which first communicates control data and next communicates first user data further performs communication by fixing the transmission mode to the spatial diversity (SD), which is a quality-oriented transmission mode, even for a period of time when the first user data is communicated, as compared to the case where the transmission mode only for the first control data is fixed to the spatial diversity (SD) as in the first embodiment.

Thereby, since the transmission/reception device performs communication in a quality-oriented mode for a longer period of time than that of the first embodiment, a disconnection of communication may be further prevented. Since it is possible to appropriately determine the transmission mode after the passage of a period of time on the basis of a communication situation for the period of time when communication is performed by the above-described fixation, a disconnection of communication may be prevented even in communication after the passage of the period of time, and the decrease in transmission capacity may be prevented.

Third Embodiment

The transmission/reception device of the first embodiment fixes the transmission mode to the spatial diversity (SD) from the start of communication of first control data to the completion of reception, but the transmission/reception device of this embodiment fixes the transmission mode to the spatial diversity (SD) from the start of communication of first user data to the completion of reception of first user data.

Figure 8:
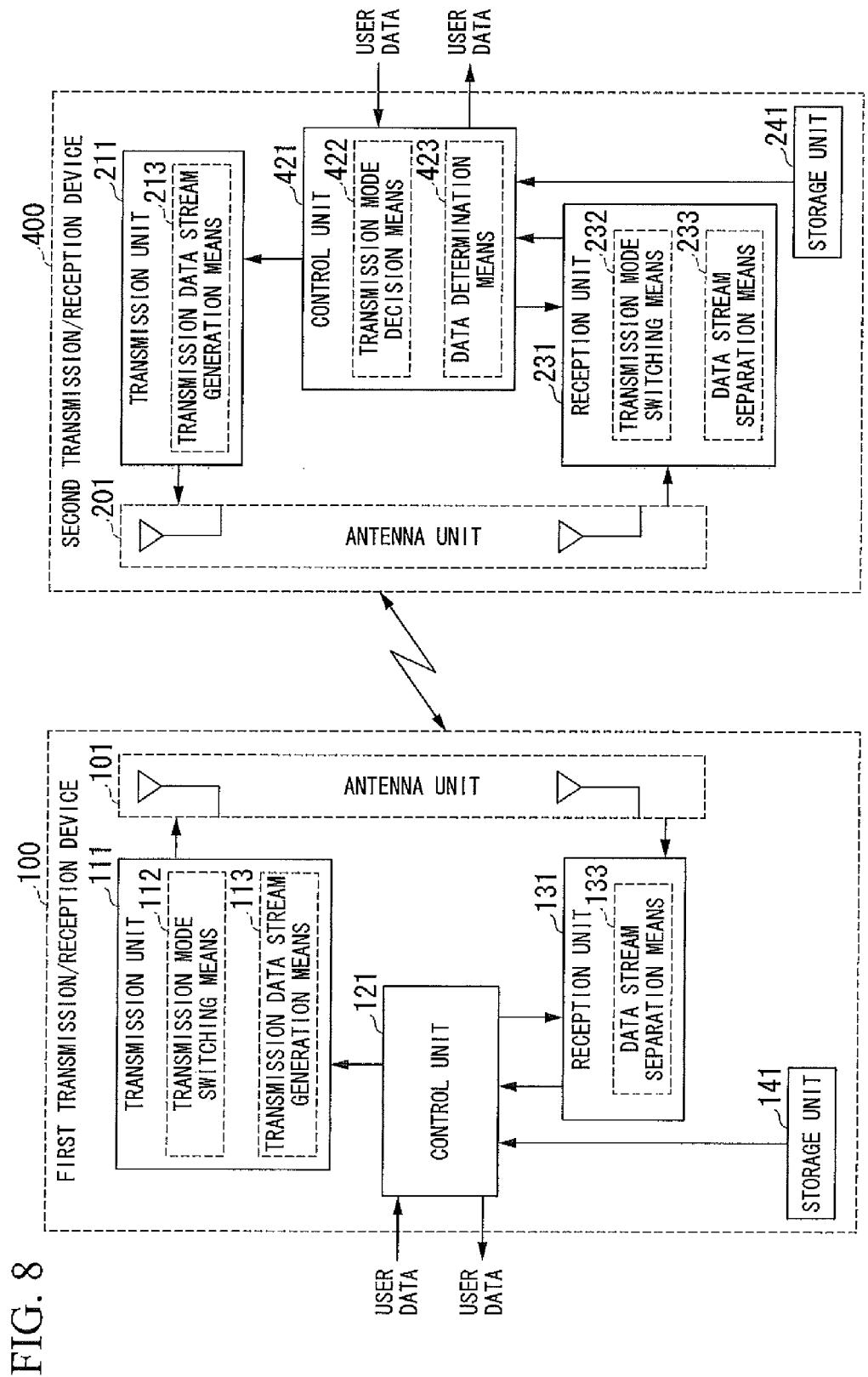
FIG. 8 is a block diagram of transmission/reception devices according to a third embodiment of the present invention.

FIG. 8 is a schematic block diagram showing the configuration of a first transmission/reception device 100 and a second transmission/reception device 400 of this embodiment. When this embodiment is compared to the first embodiment, a control unit 421 is different. However, since a function provided in each element thereof is the same as in the first embodiment, description of the same function as in the first embodiment is omitted.

The control unit 421 has a data determination means 423 and a transmission mode decision means 422, and decides a transmission mode according to each communication situation.

The data determination means 423 determines whether or not received data is first user data after the start of communication. When it is the first user data, the transmission mode decision means 422 fixes the transmission mode to the spatial diversity (SD). When the received data is not the first user data, that is, when control data is included in the received data, the transmission mode decision means 422 decides the transmission mode by the above-described dynamic decision. Thereafter, since received data is not the first user data even though the received data is user data, the transmission mode is decided by the above-described dynamic decision method.

The control unit 421 outputs information of the above-described transmission mode decided by the transmission mode decision means 422 to the transmission unit 211. Also, the control unit 421 outputs the above-described transmission mode to the transmission mode switching means 432 at a synchronous timing based on a given transmission cycle stored in the storage unit 241. In this regard, the control unit 421 sets the transmission mode information immediately after the start of communication as the spatial diversity (SD).

The control unit 421 outputs user data input from the reception unit 231 to other peripheral circuits provided in the second transmission/reception device 400, and outputs user data and control data input from peripheral circuits to the transmission unit 211.

Figure 9:
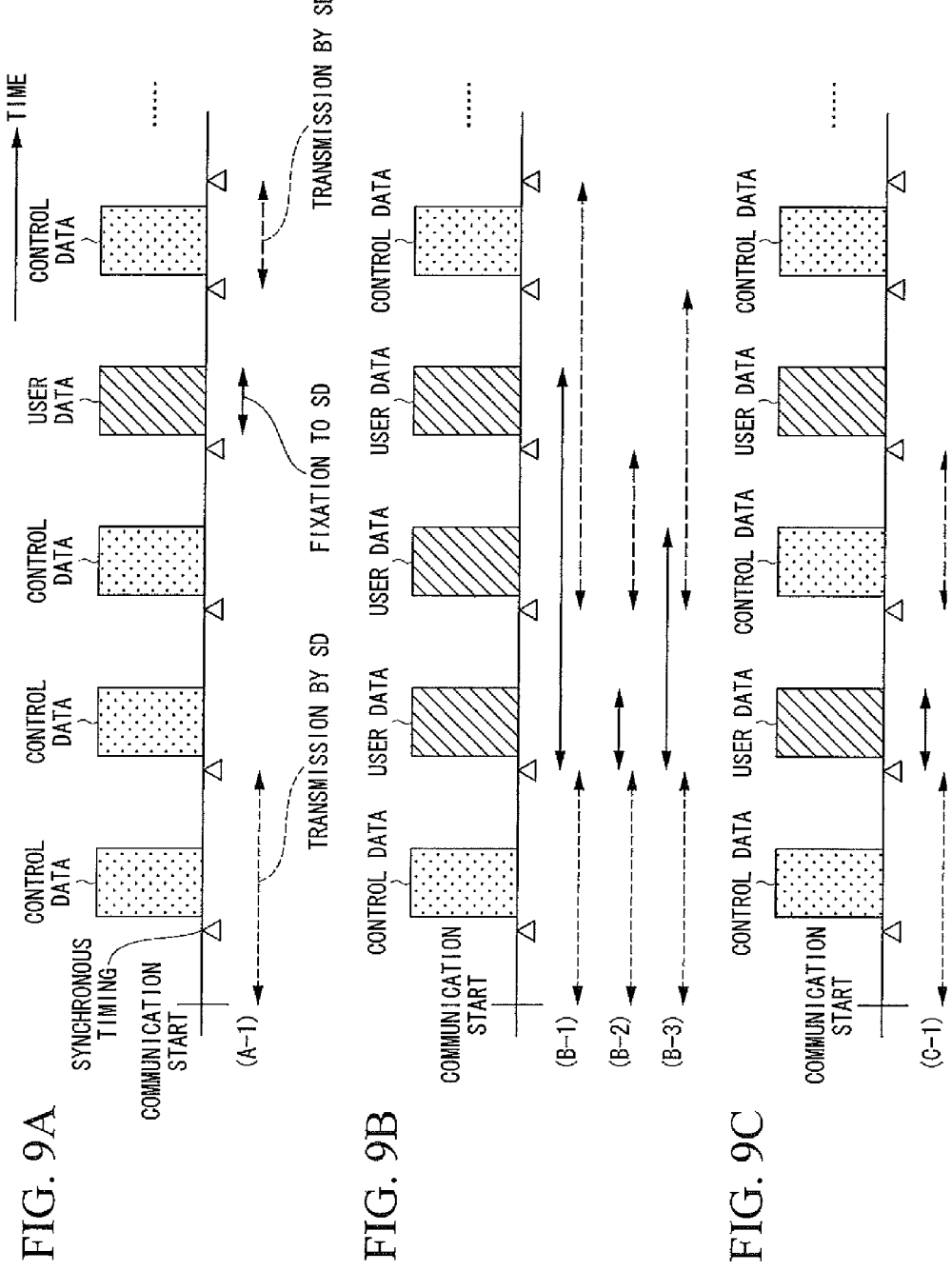
FIG. 9 is a diagram illustrating a method of switching a transmission mode according to the third embodiment of the present invention.

Hereinafter, a relationship between communication data and communication schemes will be specifically described. FIG. 9 is a schematic diagram illustrating a method of switching a transmission mode of this embodiment. In FIG. 9, the horizontal axis is the time. Since data shown in FIGS. 9(*a*) to (*c*) is the same as shown in FIGS. 3(*a*) to (*c*), description thereof is omitted.

A range in which the transmission mode decision means 422 fixes the transmission mode to the spatial diversity (SD) and a range in which the transmission mode of communication from the first transmission/reception device 100 to the second transmission/reception device 400 is fixed to the spatial diversity (SD) will be described.

In (a-1) of FIG. 9, control data which is first transmission cycle data is communicated by the spatial diversity (SD) which is a predetermined transmission mode immediately after the start of communication. The communication in the transmission mode is in a range indicated by the dotted-line arrow of (a-1) of FIG. 3.

First to third transmission cycle data are control data. Accordingly, the transmission mode decision means 422 decides the transmission mode by the above-described dynamic decision. On the basis of the decision, the first transmission/reception device 100 and the second transmission/reception device 400 switch the transmission mode to the decided transmission mode at the next synchronous timing.

Fourth transmission cycle data is user data which is first user data. Accordingly, the transmission mode decision means 422 fixes the transmission mode to the spatial diversity (SD). On the basis of the fixation, fifth transmission cycle data is communicated in the transmission mode by the spatial diversity (SD).

Next, since the fifth transmission cycle data is control data, not user data, the first user data is data to the fourth transmission cycle data. Accordingly, for transmission cycle data after the fifth, the transmission mode decision means 422 decides the transmission mode by the above-described dynamic decision.

A range in which the transmission mode decision means 422 fixes the transmission mode to the spatial diversity (SD) is indicated by the solid-line arrow of (a-1) of FIG. 9. A range in which the transmission mode of communication from the first transmission/reception device 100 to the second transmission/reception device 400 is fixed to the spatial diversity (SD) is indicated by the dashed-line arrow of (a-1) of FIG. 9.

Likewise, in the cases of (b-1) and (c-1) of FIG. 9, a range in which the transmission mode decision means 422 fixes the transmission mode to the spatial diversity (SD) is indicated by the solid-line arrow. A range in which the transmission mode of communication from the first transmission/reception device 100 to the second transmission/reception device 400 is fixed to the spatial diversity (SD) is indicated by the dashed-line arrow. Ranges indicated by the dotted-line arrows of (b-1) and (c-1) of FIG. 9 are those in which the spatial diversity (SD) is set immediately after the start of communication.

The transmission mode decision means 422 counts the number of transmission cycle data from the start of communication of first user data, and may fix the transmission mode to the spatial diversity (SD) until the counted number of communication data reach a given number.

(b-3) of FIG. 9 is the case where the above-described preset number is 2. First transmission cycle data is communicated by the spatial diversity (SD) which is the predetermined transmission mode immediately after the start of communication. Communication of the transmission mode is in a range indicated by the dotted-line arrow of (b-3) of FIG. 9.

When second transmission cycle data which is first user data is input, the transmission mode decision means 422 starts to count the number of transmission cycle data and sets the second transmission cycle data as 1. Since the number of transmission cycle data has not reached the preset number, 2, the transmission mode decision means 422 fixes the transmission mode to the spatial diversity (SD). On the basis of the fixation, third transmission cycle data is communicated in the transmission mode by the spatial diversity (SD).

When the third transmission cycle data is input, the number of transmission cycle data counted by the transmission mode decision means 422 becomes 2. Accordingly, the transmission mode decision means 422 decides the transmission mode by the above-described dynamic decision for subsequent transmission cycle data. On the basis of the decision, the first transmission/reception device 100 and the second transmission/reception device 400 switch the transmission mode to the decided transmission mode at the next synchronous timing.

Thereby, a range in which the transmission mode decision means 422 fixes the transmission mode to the spatial diversity (SD) is indicated by the solid-line arrow of (b-3) of FIG. 9. A range in which the transmission mode of communication from the first transmission/reception device 100 to the second transmission/reception device 400 is fixed to the spatial diversity (SD) is indicated by the dashed-line arrow of (b-3) of FIG. 9.

Likewise, (b-2) of FIG. 9 is the case where the above-described preset number is 1.

Figure 10:
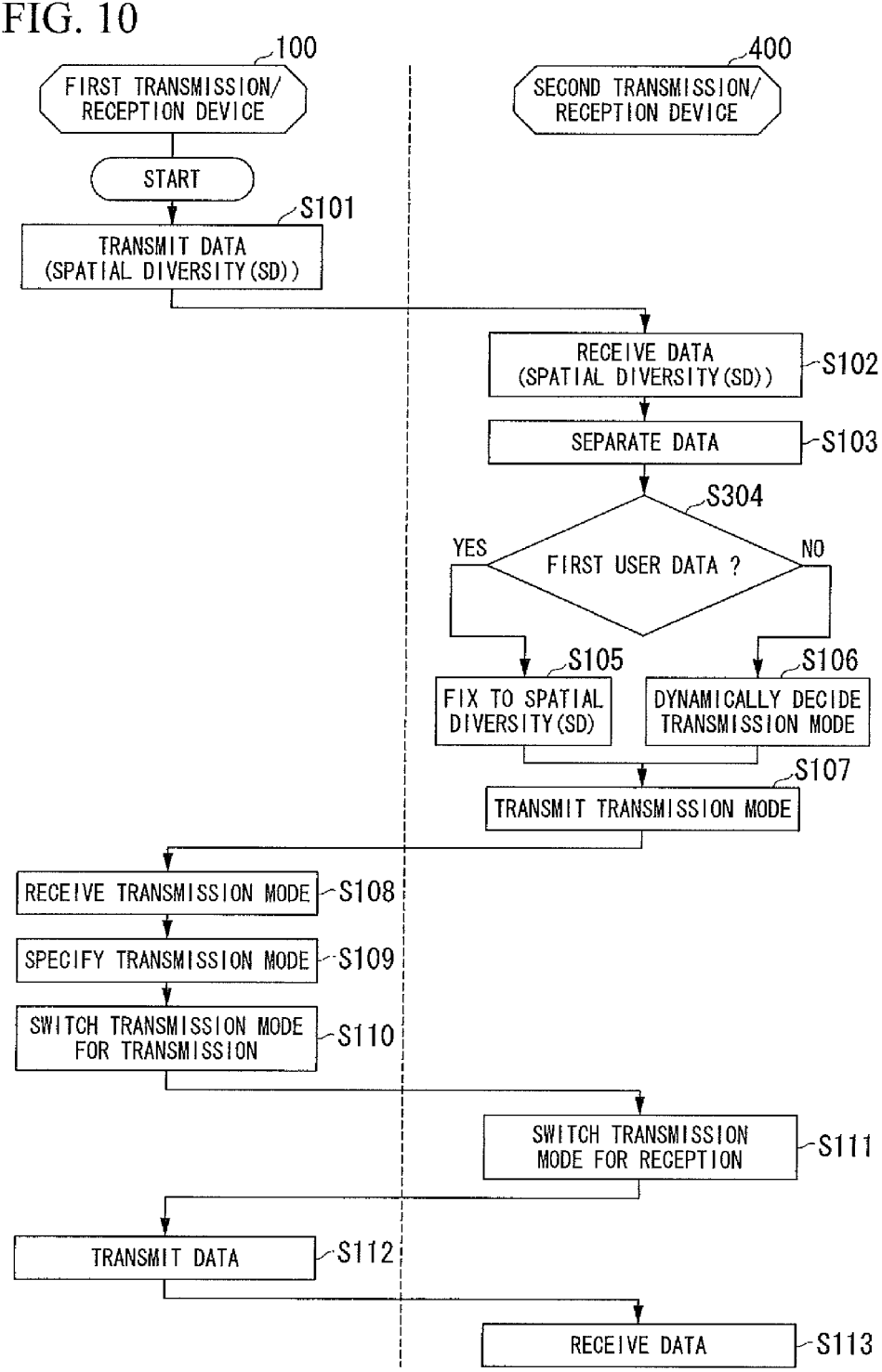
FIG. 10 is a flow diagram according to the third embodiment of the present invention.

Next, the operation will be described. FIG. 10 is a flow diagram showing the operation of this embodiment.

A determination method of S304 is different in this embodiment compared to that of the first embodiment. However, since the other operations are the same as in the first embodiment, description of the same operations as in the first embodiment is omitted.

In this embodiment, the data determination means 423 of the control unit 421 determines whether or not input data is first user data after the start of communication (S304). The transmission mode decision means 422 fixes the transmission mode to the spatial diversity (SD) when it is the first user data (S105), and decides the transmission mode by the above-described dynamic decision when it is not the first user data (S106).

Since the communication of control data is completed in a short time in terms of general communication and the communication is completed in a preset transmission mode immediately after the start of communication, it may not be necessary to determine the transmission mode. According to this embodiment, it is possible to simplify a circuit or program of the transmission/reception device since the transmission/reception device fixes the transmission mode to the spatial diversity (SD) on the basis of only user data without fixing the transmission mode to the spatial diversity (SD) on the basis of control data as in the second embodiment.

Fourth Embodiment

The transmission/reception device of the first embodiment fixes the transmission mode to the spatial diversity (SD) from the start of communication to the completion of reception, but the transmission/reception device of this embodiment fixes the transmission mode to the spatial diversity (SD) from the start of communication of first control data to the passage of a fixed time.

Figure 11:
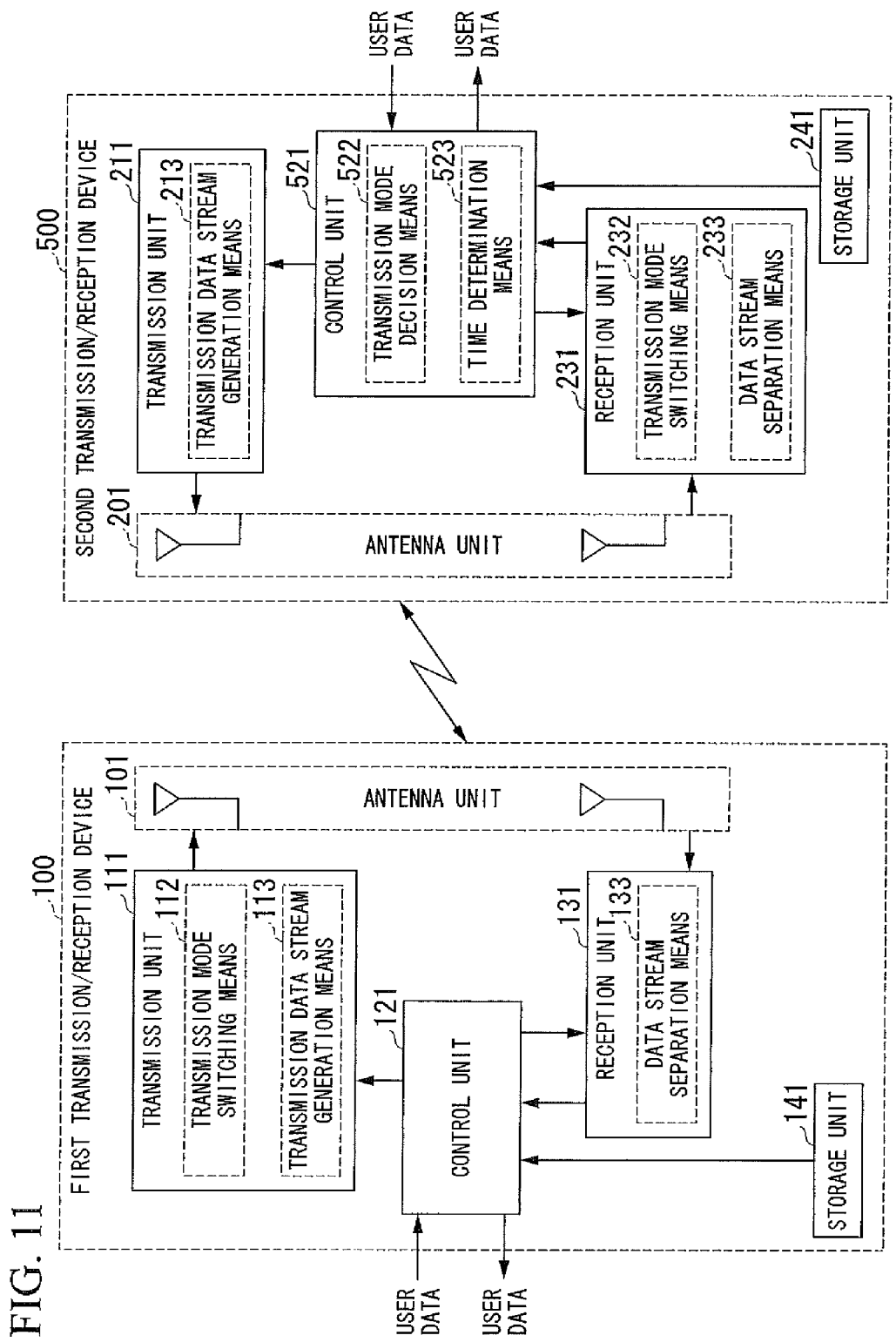
FIG. 11 is a block diagram of transmission/reception devices according to a fourth embodiment of the present invention.

FIG. 11 is a schematic block diagram showing the configuration of a first transmission/reception device 100 and a second transmission/reception device 500 of this embodiment. When this embodiment is compared to the first embodiment, a control unit 521 is different. However, since a function provided in each element thereof is the same as in the first embodiment, description of the same function as in the first embodiment is omitted.

The control unit 521 has a time determination means 523 and the transmission mode decision means 522, and decides a transmission mode in response to a communication time.

The time determination means 523 determines whether or not a given time ΔT has elapsed from the start of communication, and the transmission mode decision means 522 fixes the transmission mode to the spatial diversity (SD) until ΔT has elapsed from the start of communication. When ΔT has elapsed from the start of communication, the transmission mode decision means 522 decides the transmission mode by the above-described dynamic decision.

The control unit 521 outputs information of the transmission mode fixed or decided by the transmission mode decision means 522 to the transmission unit 211. Also, the control unit 521 outputs the above-described transmission mode to the transmission mode switching means 532 at a synchronous timing based on a given transmission cycle stored in the storage unit 241. In this regard, the control unit 321 sets the transmission mode information immediately after the start of communication as the spatial diversity (SD).

The control unit 521 outputs user data input from the reception unit 231 to other peripheral circuits provided in the second transmission/reception device 500, and outputs user data and control data input from peripheral circuits to the transmission unit 211.

Figure 12A:
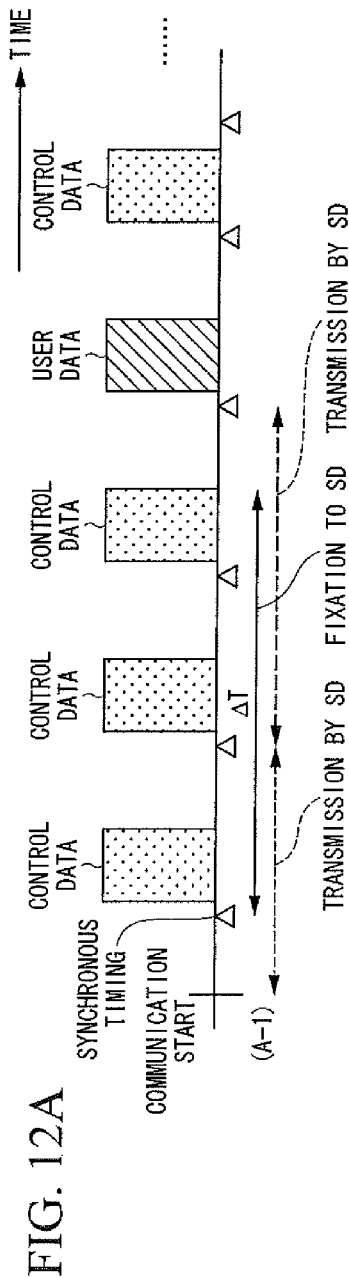
FIG. 12 is a diagram illustrating a method of switching a transmission mode according to the fourth embodiment of the present invention.
Figure 12B:
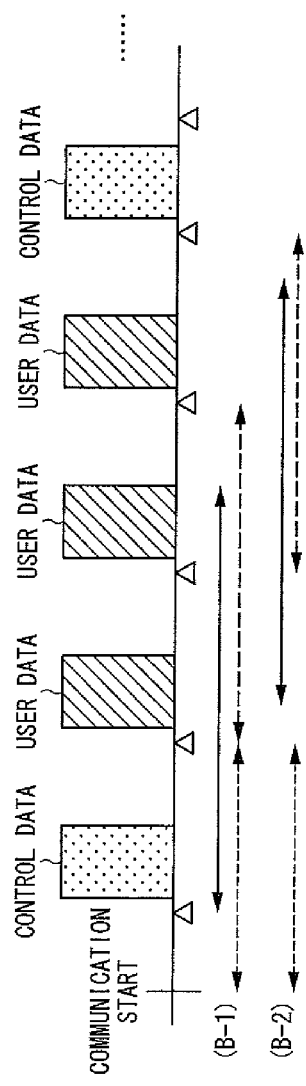
Figure 12C:
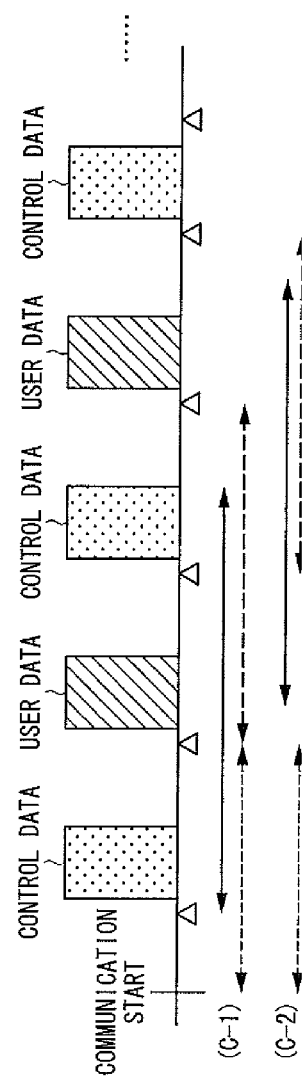

Hereinafter, a relationship between communication data and communication schemes will be specifically described. FIG. 12 is a schematic diagram illustrating a method of switching a transmission mode of this embodiment. In FIG. 12, the horizontal axis is the time. Since data shown in FIGS. 12(a) to (c) is the same as shown in FIGS. 3(a) to (c), description thereof is omitted.

A range in which the transmission mode decision means 522 fixes the transmission mode to the spatial diversity (SD) and a range in which the transmission mode of communication from the first transmission/reception device 100 to the second transmission/reception device 500 is fixed to the spatial diversity (SD) will be described.

In (a-1) of FIG. 12, first transmission cycle data is communicated by the spatial diversity (SD) which is a predetermined transmission mode immediately after the start of communication. The communication of the transmission mode is in a range indicated by the dotted-line arrow of (a-1) of FIG. 3.

After the reception of the first transmission cycle data is started, the time determination means 523 starts to measure a time. When second and third transmission cycle data is received, ΔT has not elapsed after the start of reception of the first transmission cycle data. Accordingly, the transmission mode decision means 522 fixes the transmission mode to the spatial diversity (SD). On the basis of the fixation, the second and third transmission cycle data is communicated in the transmission mode by the spatial diversity (SD).

Before fourth transmission cycle data is received, ΔT has elapsed after the start of reception of the first transmission cycle data. Accordingly, the transmission mode decision means 522 decides the transmission mode by the above-described dynamic decision after the passage of ΔT after the start of reception of the first transmission cycle data. On the basis of the decision, the first transmission/reception device 100 and the second transmission/reception device 500 switch the transmission mode to the decided transmission mode at the next synchronous timing.

A range in which the transmission mode decision means 522 fixes the transmission mode to the spatial diversity (SD) is indicated by the solid-line arrow of (a-1) of FIG. 12. A range in which the transmission mode of communication from the first transmission/reception device 100 to the second transmission/reception device 500 is fixed to the spatial diversity (SD) is indicated by the dashed-line arrow of (a-1) of FIG. 12.

Likewise, in the cases of (b-1) and (c-1) of FIG. 12, a range in which the transmission mode decision means 522 fixes the transmission mode to the spatial diversity (SD) is indicated by the solid-line arrow. A range in which the transmission mode of communication from the first transmission/reception device 100 to the second transmission/reception device 500 is fixed to the spatial diversity (SD) is indicated by the dashed-line arrow.

Until the given time ΔT has elapsed from the start of reception of the first user data, the transmission mode decision means 522 is able to fix the transmission mode to the spatial diversity (SD).

In (b-2) of FIG. 12, first transmission cycle data is communicated by the spatial diversity (SD) which is a predetermined transmission mode immediately after the start of communication. The communication in the transmission mode is in a range indicated by the dotted-line arrow of (b-2) of FIG. 12.

The first transmission cycle data is control data. Accordingly, the transmission mode decision means 522 decides the transmission mode by the above-described dynamic decision. On the basis of the decision, the first transmission/reception device 100 and the second transmission/reception device 500 switch the transmission mode to the decided transmission mode at the next synchronous timing.

Second transmission cycle data is user data which is first user data. Accordingly, the transmission mode decision means 522 starts to measure a time.

When third and fourth transmission cycle data is received, ΔT has not elapsed after the start of reception of the first user data. Accordingly, the transmission mode decision means 522 fixes the transmission mode to the spatial diversity (SD). On the basis of the fixation, the third and fourth transmission cycle data is communicated in the transmission mode by the spatial diversity (SD).

Before fifth transmission cycle data is received, ΔT has elapsed after the start of reception of the first user data.

Accordingly, the transmission mode decision means 522 decides the transmission mode by the above-described dynamic decision after the passage of ΔT after the start of reception of the first user data. On the basis of the decision, the first transmission/reception device 100 and the second transmission/reception device 500 switch the transmission mode to the decided transmission mode at the next synchronous timing.

Thereby, a range in which the transmission mode decision means 522 fixes the transmission mode to the spatial diversity (SD) is indicated by the solid-line arrow of (b-2) of FIG. 12. A range in which the transmission mode of communication from the first transmission/reception device 100 to the second transmission/reception device 500 is fixed to the spatial diversity (SD) is indicated by the dashed-line arrow of (b-2) of FIG. 12.

Likewise, in the case of (c-2) of FIG. 12, a range in which the transmission mode decision means 522 fixes the transmission mode to the spatial diversity (SD) is indicated by the solid-line arrow. A range in which the transmission mode of communication from the first transmission/reception device 100 to the second transmission/reception device 500 is fixed to the spatial diversity (SD) is indicated by the dashed-line arrow. A range indicated by the dotted-line arrow of (c-2) of FIG. 12 is a range in which the spatial diversity (SD) is set immediately after the start of communication.

Figure 13:
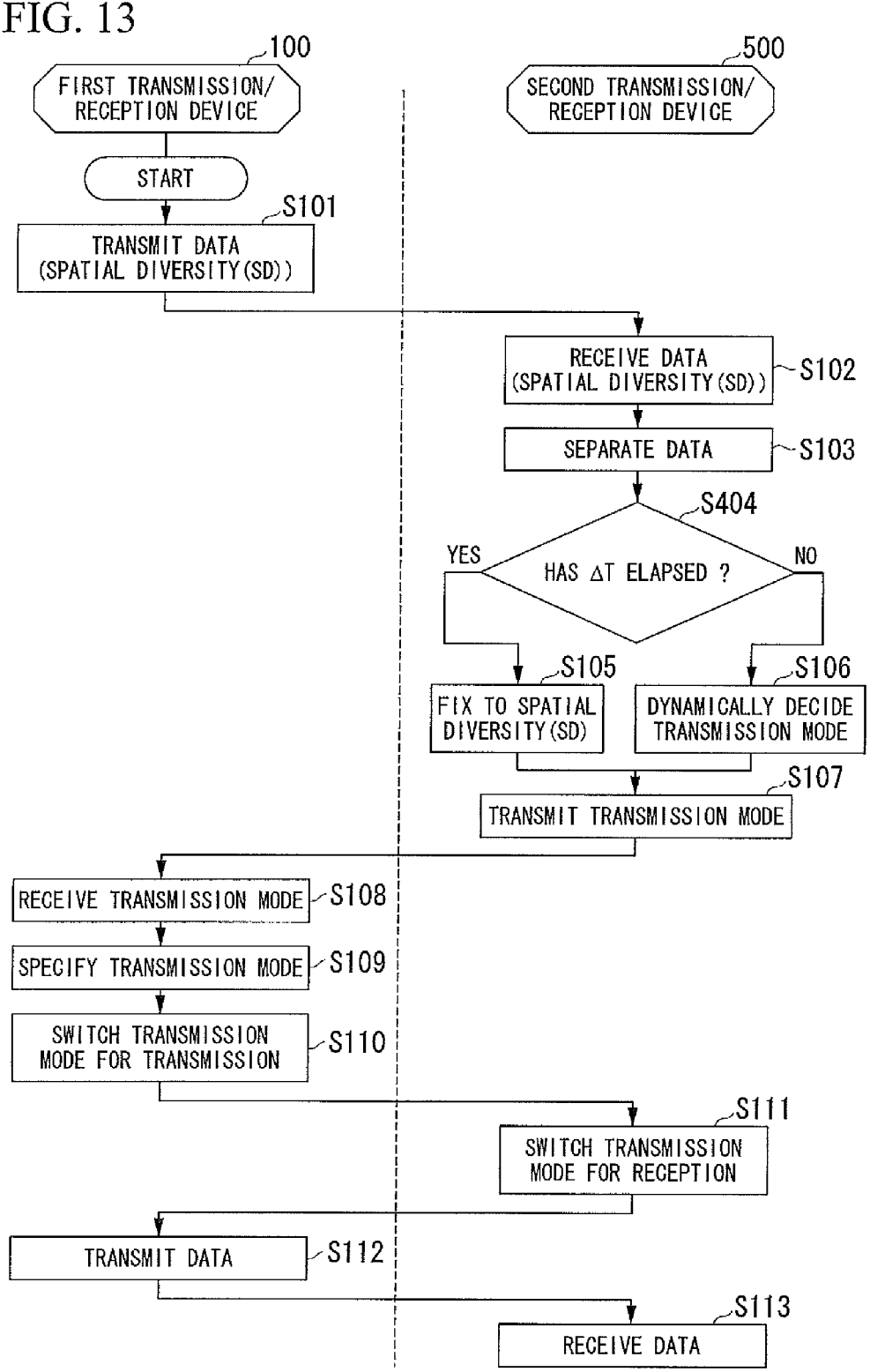
FIG. 13 is a flow diagram according to the fourth embodiment of the present invention.

Next, the operation will be described. FIG. 13 is a flow diagram showing the operation of this embodiment.

The determination method of S404 is different in this embodiment compared to that of the first embodiment. However, since the other operations are the same as in the first embodiment, description of the same operations as in the first embodiment is omitted.

In this embodiment, the time determination means 523 of the control unit 521 determines whether or not a fixed time ΔT has elapsed after the start of reception of first transmission cycle data (S404). The transmission mode decision means 522 fixes the transmission mode to the spatial diversity (SD) until ΔT has elapsed from the start of communication (S105), and decides the transmission mode by the above-described dynamic decision when ΔT has elapsed from the start of communication (S106).

According to this embodiment, the transmission/reception device performs communication by fixing the transmission mode to the spatial diversity (SD) which is a quality-oriented transmission mode until a given time has elapsed from the start of communication.

Thereby, the transmission/reception device is able to prevent a disconnection of communication since communication for a period of time is performed in a quality-oriented transmission mode without erroneously selecting a mode having a low communication quality. Since it is possible to appropriately determine a transmission mode after the passage of the period of time on the basis of a communication situation for the period of time, a disconnection of communication may be prevented even in the communication after the passage of the period of time and a decrease in transmission capacity may be prevented.

Fifth Embodiment

Figure 14:
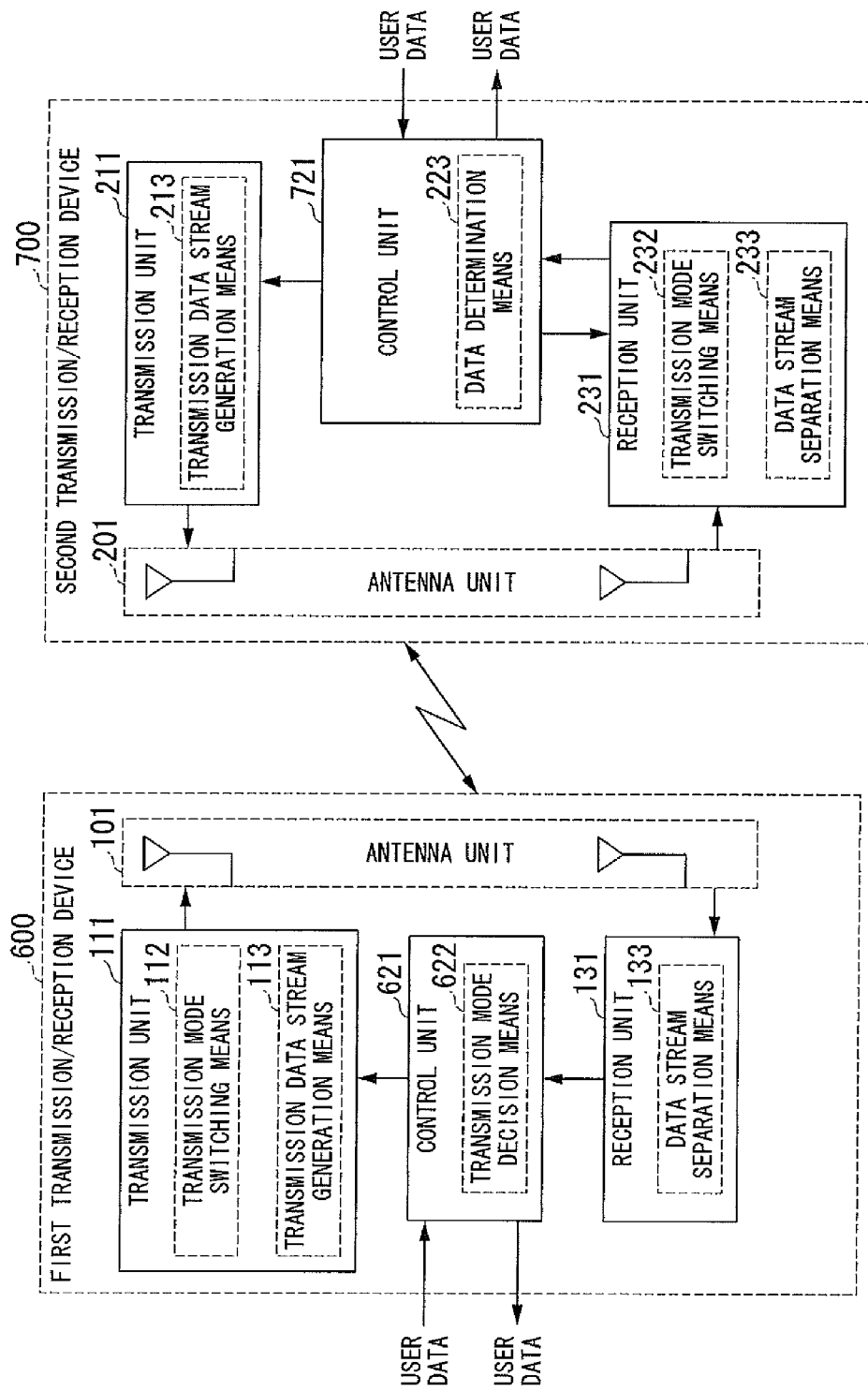
FIG. 14 is a block diagram of transmission/reception devices according to a fifth embodiment of the present invention.

The second transmission/reception device 200 has a transmission mode decision unit in the first embodiment, but a first transmission/reception device 600 has a transmission mode decision unit in this embodiment. Hereinafter, this embodiment will be described in detail with reference to the drawings. FIG. 14 is a block diagram showing an outline of the fifth embodiment related to a radio transmission/reception system which performs data communication from the first transmission/reception device 600 to a second transmission/reception device 700 applicable to the practice of the present invention.

In this embodiment, the transmission/reception device fixes the transmission mode to the spatial diversity (SD) from the start of communication of first control data to the completion of reception. It is assumed that the transmission mode immediately after the start of communication is set as the spatial diversity (SD).

First, the first transmission/reception device 600 will be described. When this embodiment is compared to the first embodiment, a control unit 621 is different. However, since a function provided in each element thereof is the same as in the first embodiment, description of the same function as in the first embodiment is omitted.

The control unit 621 specifies transmission mode determination information to be described later from data input from the reception unit 131. A transmission mode decision means 622 provided in the control unit 621 decides the transmission mode on the basis of the input transmission mode determination information transmitted by the second transmission/reception device 700.

When the above-described transmission mode determination information is first control data, the transmission mode decision means 622 fixes the transmission mode to the spatial diversity (SD). When the above-described transmission mode determination information is not first control data, the transmission mode decision means 622 decides the transmission mode as one of the spatial diversity (SD), the spatial multiplexing (SM), and the beam forming (BF).

The control unit 621 outputs the transmission mode information fixed or decided by the transmission mode decision means 622 to the transmission unit 111. Also, the control unit 621 outputs the above-described transmission mode to the transmission mode switching means 132 at a synchronous timing based on a given transmission cycle stored in the storage unit 141. In this regard, the control unit 621 sets the transmission mode information immediately after the start of communication as the spatial diversity (SD).

The control unit 621 outputs user data input from the reception unit 131 to other peripheral circuits provided in the first transmission/reception device 600, and outputs user data and control data input from peripheral circuits to the transmission unit 111.

Next, the second transmission/reception device 700 will be described. When this embodiment is compared to the first embodiment, a control unit 721 is different. However, since a function provided in each element thereof is the same as in the first embodiment, description of the same function as in the first embodiment is omitted.

The control unit 721 has the same data determination means 223 as in the first embodiment, and outputs the above-described transmission mode determination information determined by the data determination means 223 to the transmission unit 211. The transmission mode determination information is transmitted as control data to the first transmission/reception device 600 via the transmission unit 211 and the antenna unit 201. Also, the control unit 721 specifies transmission mode information decided by the first transmission/reception device 600 from data input from the reception unit 231, and outputs the specified information to the transmission mode switching unit 232.

The control unit 721 outputs user data input from the reception unit 231 to other peripheral circuits provided in the second transmission/reception device 700, and outputs user data and control data input from peripheral circuits to the transmission unit 211.

Next, the operation will be described. FIG. 15 is a flow diagram showing the operation of this embodiment.

First, the first transmission/reception device 600 transmits data by the spatial diversity (SD) which is the transmission mode immediately after the start of communication (S101).

The second transmission/reception device 700 receives a signal transmitted from the first transmission/reception device 600 by the antenna unit 201, and outputs the received signal to the reception unit 231 (S102). The reception unit 231 demodulates the received signal received by the spatial diversity (SD) which is the transmission mode immediately after the start of communication, separates a demodulated received data stream into user data and control data, and outputs the separated data to the control unit 221 (S103).

The control unit 721 outputs the above-described transmission mode determination information determined by the data determination means 223 to the transmission unit 211, and the transmission unit 211 generates the transmission mode determination information as a data stream by the transmission data stream generation means 213, and outputs the generated information to the first transmission device 600 via the antenna 201 (S501).

Next, the first transmission/reception device 600 receives the transmission mode determination information transmitted from the second transmission/reception device 700 by the antenna unit 101, and outputs the received information to the reception unit 131. The reception unit 131 demodulates a received signal, separates a demodulated received data stream into user data and control data, and outputs the separated data to the control unit 621 (S502). The control unit 621 specifies the transmission mode determination information from input control data, and decides the transmission mode on the basis of the transmission mode determination information.

Specifically, the transmission mode decision means 622 provided in the control unit 621 determines whether or not the transmission mode determination information is first control data (S503). The transmission mode decision means 622 fixes the transmission mode to the spatial diversity (SD) when the data received by the second transmission/reception device 700 is the first control data (S504), and decides the transmission mode by the above-described dynamic decision when it is not the first control data (S505).

The control unit 621 outputs the decided transmission mode information as transmission data to the transmission unit 111, and the transmission unit 111 transmits the transmission mode information to the second transmission/reception device 700 via the antenna unit 101 (S506).

The second transmission/reception device 700 receives the transmission mode information transmitted from the first transmission/reception device 600 by the antenna unit 201, and outputs the received information to the reception unit 231. The reception unit 231 demodulates a received signal received in the spatial diversity (SD) which is an initial transmission mode, separates a demodulated received data stream into user data and control data, and outputs the separated data to the control unit 721 (S507). The control unit 721 specifies the transmission mode information included in the control data input from the reception unit 231 (S508).

On the other hand, the control unit 621 provided in the first transmission/reception device 600 outputs the specified transmission mode information to the transmission unit 111 at the synchronous timing based on a transmission cycle stored in the storage unit 141. The transmission mode switching means 112 of the transmission unit 111 switches the transmission mode in which transmission is performed to the spatial multiplexing (SM), the spatial diversity (SD), or the beam forming (BF) according to the above-described transmission mode information input from the control unit 121 (S509).

The control unit 721 included in the second transmission/reception device 700 outputs the transmission mode information fixed in step S504 or decided in step S505 to the reception unit 231 at a synchronous timing based on the transmission cycle stored in the storage unit 241. The reception unit 231 provided in the second transmission/reception device 700 switches the transmission mode in which reception is performed to the spatial multiplexing (SM), the spatial diversity (SD), or the beam forming (BF) according to the above-described transmission mode information input from the control unit 221 (S510). It is possible to perform communication in which the transmission modes of the first transmission/reception device 600 and the second transmission/reception device 700 are unified.

The transmission unit 111 provided in the first transmission/reception device 600 transmits data to the second transmission/reception device 700 via the antenna 101 in the transmission mode of the above-described transmission mode information (S511). The reception unit 231 of the second transmission/reception device 700 receives a transmitted signal from the first transmission/reception device 600 via the antenna 201 in the above-described transmission mode, and demodulates the received signal (S512).

In this embodiment, the first transmission/reception device 600 performs communication by fixing the transmission mode to the spatial diversity (SD) which is a quality-oriented transmission mode until control data is transmitted to the second transmission/reception device 700 from the start of communication even though the first transmission/reception device 600 has the transmission mode decision means to decide the transmission mode.

Thereby, the transmission/reception device is able to prevent a disconnection of communication since communication for a period of time is performed in a quality-oriented mode without erroneously selecting a mode having a low communication quality. Since it is possible to appropriately determine a transmission mode after the passage of the period of time on the basis of a communication situation for the period of time, a disconnection of communication may be prevented even after the passage of the period of time and a decrease in transmission capacity may be prevented.

In all the embodiments described above, the transmission/reception device sets the transmission mode as the spatial diversity (SD) for a given period of time from the start of communication, but the present invention is not limited thereto. The spatial diversity (SD) may be set for a given period of time from the resumption of communication. For example, the communication resumption is the case where communication is temporarily interrupted on the move and thereafter is resumed, or the case where communication is temporarily disabled in a place where the quality of radio wave reception is low and thereafter is resumed.

Thereby, it is possible to perform communication in a quality-oriented transmission mode even after the communication resumption and prevent a decrease in transmission capacity by high communication quality. In particular, the communication resumption is effectively necessary since there are many situations where the quality of communication is poor.

In all the embodiments described above, the first transmission/reception devices 100 and 600 may be base station devices which communicate with a plurality of mobile station devices, and the second transmission/reception devices 200 300, 400, 500, and 700 may be mobile station devices. In contrast, the first transmission/reception devices 100 and 600 may be mobile station devices which communicate with a plurality of mobile station devices, and the second transmission/reception devices 200 300, 400, 500, and 700 may be base station devices. Simply, the first transmission/reception devices 100 and 600 and the second transmission/reception devices 200 300, 400, 500, and 700 may perform transmission/reception on a one-to-one basis.

In all the embodiments, the transmission/reception device is not limited to two antennas, and any number of antennas may be used. In addition, the first transmission/reception device and the second transmission/reception device are not limited to the same number of antennas.

The transmission mode decision means may decide a transmission mode in a frequency band in which transmission/reception is performed by one antenna, and the transmission mode may be different from that of a frequency band in which transmission/reception is performed by another antenna. The transmission mode decision means may not affect the decision of a transmission mode by neglecting control data for transmitting/receiving the transmission mode information.

The practice of the present invention is not limited to the switching of the spatial multiplexing (SM), the spatial diversity (SD), and the beam forming (BF). For example, two transmission modes like the spatial multiplexing (SM) and the spatial diversity (SD) may be switched and four or more transmission modes may be switched.

In the above-described embodiment, a process of each part may be executed by recording a program for implementing a function of the transmission unit 111, the control unit 121, the reception unit 131, the transmission unit 211, the control unit 221, and the reception unit 231 of FIG. 1, the transmission unit 111, the control unit 121, the reception unit 131, the transmission unit 211, the control unit 321, and the reception unit 231 of FIG. 5, the transmission unit 111, the control unit 121, the reception unit 131, the transmission unit 211, the control unit 421, and the reception unit 231 of FIG. 8, the transmission unit 111, the control unit 121, the reception unit 131, the transmission unit 211, the control unit 521, and the reception unit 231 of FIG. 9, and the transmission unit 111, the control unit 621, the reception unit 131, the transmission unit 211, the control unit 721, and the reception unit 231 of FIG. 12 to a computer readable recording medium and enabling a computer system to read and execute the program recorded to the recording medium. The "computer system" used herein includes an OS and hardware, such as peripheral devices.

When a WWW system is used, the computer system includes a homepage providing the environment (or display environment).

The "computer readable recording medium" is a portable medium such as a flexible disc, magneto-optical disc, ROM and CD-ROM, and a storage device, such as a hard disk, built in the computer system. Furthermore, the "computer readable recording medium" may also include a medium that dynamically holds a program for a short period of time, such as a communication line when a program is transmitted via a network such as the Internet or a communication network such as a telephone network, and a medium that holds a program for a fixed period of time, such as a volatile memory in a computer system serving as a server or client in the above situation. The program may be one for implementing part of the above functions, or the above functions may be implemented in combination with a program already recorded to the computer system.

The embodiments of the present invention have been described in detail with reference to the drawings. However, specific configurations are not limited to the embodiments and may include any design in the scope without departing from the subject matter of the present invention.

INDUSTRIAL APPLICABILITY

The present invention is suitable for use in a mobile station device and a radio communication system related to mobile communication, and techniques similar thereto, and is able to prevent a disconnection of communication and prevent a decrease in transmission capacity.

The invention claimed is:

1. A communication system comprising:
a mobile station device; and
a base station device configured to communicate with the mobile station device by setting a spatial diversity mode and a spatial multiplexing mode as transmission modes;
wherein
the base station device is further configured to transmit
by the spatial diversity mode, control information to the mobile station device, the control information being always reported to the mobile station device by the spatial diversity mode during multiple transmission periods upon start of communication with the mobile station device; and
by the spatial multiplexing mode or the spatial diversity mode with dynamical configuration, user data to the mobile station device; and
the mobile station device is configured to receive
by the spatial diversity mode, the control information from the base station device; and
by the spatial multiplexing mode or the spatial diversity mode with the dynamical configuration of the base station device, the user data from the base station device.

2. The communication system according to claim 1, wherein after the base station device completes transmission of the control information, the base station device transmits the user data to the mobile station device according to the control information.

3. The communication system according to claim 1, wherein start of the communication includes restart of the communication between the base station device and the mobile station device after the communication is temporarily suspended.

4. A method comprising:
setting, by a base station device, a spatial diversity mode and a spatial multiplexing mode as transmission modes to communicate with a mobile station device;
transmitting, by the base station device through the spatial diversity mode, control information to the mobile station device, the control information being always reported to the mobile station device by the spatial diversity mode during multiple transmission periods upon start of communication with the mobile station device; and
transmitting, by the base station through the spatial multiplexing mode or the spatial diversity mode with dynamical configuration, user data to the mobile station device.

5. The method according to claim 4, wherein after the base station device completes transmission of the control information, the base station device transmits the user data to the mobile station device according to the control information.

6. The method according to claim 4, wherein start of the communication includes a restart of the communication between the base station device and the mobile station device after the communication is temporarily suspended.

7. A base station device comprising:
a processor configured to setting a spatial diversity mode and a spatial multiplexing mode as transmission modes to communicate with a mobile station device; and
a transmitter configured to
transmit, by the spatial diversity mode, control information to the mobile station device, the control information being always reported to the mobile station device by the spatial diversity mode during multiple transmission periods upon start of communication with the mobile station device; and
transmit, by the spatial multiplexing mode or the spatial diversity mode with dynamical configuration by the processor, user data to the mobile station device.

8. The base station device according to claim 7, wherein the transmitter is further configured to transmit the user data to the mobile station device according to the control information after the transmitter completes transmission of the control information.

9. The base station device according to claim 7, wherein start of the communication includes restart of communication between the base station device and the mobile station device after the communication is temporarily suspended.

10. A method comprising:
receiving, by a mobile station device through a spatial diversity mode, control information from a base station device, the control information being always transmitted from a base station device by the spatial diversity mode during multiple transmission periods upon start of communication between the mobile station device and the base station device; and
receiving, by the mobile station device through a spatial multiplexing mode or the spatial diversity mode with dynamical configuration of the spatial diversity mode and the spatial multiplexing mode as transmission modes by the base station device, user data from the base station device.

11. The method according to claim 10, wherein after the base station device completes transmission of the control information, the mobile station device is received the user data according to the control information.

12. The method according to claim 10, wherein start of the communication includes restart of communication between the base station device and the mobile station device after the communication is temporarily suspended.

13. A mobile station device comprising:
a processor configured to set transmission modes according to configuration of the transmission modes by a base station; and
a receiver configured to
receive, by a spatial diversity mode, control information from the base station device, the control information being always transmitted from the base station device by the spatial diversity mode during multiple transmission periods upon start of communication between the mobile station device and the base station device; and
receive, by a spatial diversity mode or the spatial diversity mode with dynamical configuration of the spatial diversity mode and the spatial multiplexing mode as the transmission modes by the base station device, user data from the base station device.

14. The mobile station device according to claim 13, wherein after the base station device completes transmission of the control information, the receiver is further configured to receive the user data according to the control information.

15. The mobile station device according to claim 13, wherein start of the communication includes restart of communication between the base station device and the mobile station device after the communication is temporarily suspended.

16. The mobile station device according to claim 13, wherein the control information, transmitted from the base station device by the spatial diversity mode, corresponds to a transmission period in which the control information is transmitted.

* * * * *